(12) United States Patent
Boreyko et al.

(10) Patent No.: US 11,466,437 B2
(45) Date of Patent: Oct. 11, 2022

(54) FOG HARVESTER HAVING A VERTICAL WIRE ARRAY AND USES THEREOF

(71) Applicant: VIRGINIA TECH INTELLECTUAL PROPERTIES, INC., Blacksburg, VA (US)

(72) Inventors: Jonathan B. Boreyko, Blacksburg, VA (US); Brook Kennedy, Blacksburg, VA (US); Weiwei Shi, Blacksburg, VA (US); Joshua Tulkoff, Blacksburg, VA (US); Mark Anderson, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 16/975,080

(22) PCT Filed: Feb. 22, 2019

(86) PCT No.: PCT/US2019/019121
§ 371 (c)(1),
(2) Date: Aug. 21, 2020

(87) PCT Pub. No.: WO2019/165187
PCT Pub. Date: Aug. 29, 2019

(65) Prior Publication Data
US 2020/0392705 A1 Dec. 17, 2020

Related U.S. Application Data

(60) Provisional application No. 62/633,750, filed on Feb. 22, 2018.

(51) Int. Cl.
*E03B 3/28* (2006.01)
*B01D 5/00* (2006.01)

(52) U.S. Cl.
CPC ............... *E03B 3/28* (2013.01); *B01D 5/009* (2013.01)

(58) Field of Classification Search
USPC ......... 95/285, 117, 121; 96/143, 149; 261/2, 261/6, 101, DIG. 85
See application file for complete search history.

(56) References Cited

U.S. PATENT DOCUMENTS

| 5,303,498 A | 4/1994 | Yutori et al. |
| 8,747,530 B2 * | 6/2014 | Goelet ............... B01D 5/00 96/143 |

(Continued)

FOREIGN PATENT DOCUMENTS

IN 201921049689 A * 11/2020

OTHER PUBLICATIONS

International Search Report and Written Opinion issued by the U.S. Patent Office, as International Searching Authority dated Apr. 30, 2019 for PCT/US2019/019121.

(Continued)

*Primary Examiner* — Nina Bhat
(74) *Attorney, Agent, or Firm* — Carin R. Miller, Esq.; Johnson, Marcou, Isaacs & Nix, LLC

(57) ABSTRACT

Described herein are fog harvesters having a vertical wire array and systems thereof. The fog harvesters described herein can be used to harvest liquid from the air, such as from fog. The fog harvesters can, in some aspects, have improved performance in one or more aspects as compared to fog harvesters having a mesh design.

19 Claims, 30 Drawing Sheets

(56) References Cited

U.S. PATENT DOCUMENTS

| | | | |
|---|---|---|---|
| 9,352,258 B2* | 5/2016 | Park | B01D 39/083 |
| 2018/0171604 A1* | 6/2018 | Kim | B01D 5/0003 |
| 2018/0272358 A1* | 9/2018 | Damak | B03C 3/013 |
| 2018/0280849 A1* | 10/2018 | Abahusayn | B01D 45/08 |
| 2018/0347156 A1* | 12/2018 | Lessey | B01D 7/02 |
| 2019/0030475 A1* | 1/2019 | Witchey | G06K 9/4604 |
| 2020/0298174 A1* | 9/2020 | Boudreau | E03B 3/28 |
| 2020/0361965 A1* | 11/2020 | Yaghi | B01D 5/006 |
| 2020/0362543 A1* | 11/2020 | Alvarez | F28F 13/187 |
| 2020/0390047 A1* | 12/2020 | Pisarenko | A01G 31/02 |

OTHER PUBLICATIONS

Ritter, Axel, et al., "Quantification of Fog Water Collection in Three Locations of Tenerife (Canary Islands)", Water, vol. 7, pp. 3306-3319, ISSN: 2073-4441, Published: Jun. 26, 2015.

Frumau, K.F., et al., "Fog gauge performance under fog and wind-driven rain conditions", Research Gate, pp. 1-10.

Domen, J.K., et al., "Fog water as an alternative and sustainable water resource", Clean Techn Environ Policy, vol. 16, pp. 235-249, Published online: Jun. 15, 2013.

Mekonnen, et al., "Four billion people facing severe water scarcity," Sci. Adv., vol. 2, e1500323, pp. 1-6, Feb. 12, 2016.

Schemenauer, et al., "A Proposed Standard Fog Collector for Use in High-Elevation Regions," AMS, vol. 33, pp. 1313-1322, Nov. 1994.

Fessehaye, et al., "Fog-water collection for community use," Renew and Sustainable Energy Rev., vol. 29, pp. 52-62, Available online: Sep. 17, 2013.

Olivier, et al., "The implementation of fog water collection systems in South Africa," Atmos. Res., vol. 64, pp. 228-238, Accepted: Mar. 22, 2002.

Klemm, et al., "Fog as a Fresh-Water Resource: Overview and Perspectives," AMBIO, vol. 41, pp. 221-234, Published online: Feb. 12, 2012.

Park, et al., "Optimal Design of Permeable Fiber Network Structures for Fog Harvesting," Langmuir, vol. 29, pp. 13269-13277, Published: Jul. 29, 2013.

Lalia, et al., "Fog-Harvesting Potential of Lubricant-Impregnated Electrospun Nanomats," Langmuir, vol. 29, pp. 13081-13088, Sep. 25, 2013.

Rajaram, et al., "Enhancement of fog-collection efficiency of a Raschel mesh using surface coatings and local geometric changes," Colloids Surf. A, vol. 508, pp. 218-229, Available online: Aug. 22, 2016.

Holmes, et al., "Large fog collectors: New strategies for collection efficiency and structural response to wind pressure," Atmos. Res., vol. 151, pp. 236-249, Available online: Jun. 21, 2014.

Rivera, et al., "Mechanical characteristics of Raschel mesh and their application to the design of large fog collectors," Res., vol. 151, pp. 250-258, Available online: Jun. 30, 2014.

Azad, et al., "Fog collecting biomimetic surfaces: Influence of microstructure and wettability," Bioinspir. Biomim., vol. 10, 10-016004, Published: Jan. 19, 2015.

Cao, et al., "Hydrophobic/Hydrophilic Cooperative Janus System for Enhancement of Fog Collection," Small, vol. 11, No. 34, pp. 4379-4384, 2015.

Ghosh, et al., "Cooling tower fog harvesting in power plants e a pilot study," Energy, vol. 89, pp. 1018-1028, Available online: Jul. 10, 2015.

Azad et al., "Fog Collection on Polyethylene Terephthalate (PET) Fibers: Influence of Cross Section and Surface Structure," Langmuir, vol. 33, pp. 5555-5564, Published: Mar. 5, 2017.

Regalado, et al., "The design of an optimal fog water collector: A theoretical analysis," Res., vol. 178-179, pp. 45-54, Available online: Mar. 16, 2016.

Schemenauer, et al., "The Collection Efficiency of a Massive Fog Collector," Atmos Res. , vol. 24, pp. 53-69, 1989.

de Dios Rivera, "Aerodynamic collection efficiency of fog water collectors," Atmos. Res., vol. 102, pp. 53-69, Accepted: Aug. 17, 2011.

Seo, et al., "The effects of surface wettability on the fog and dew moisture harvesting performance on tubular surfaces," Sci. Rep., vol. 6, No. 24276, Published: Apr. 11, 2016.

Lee, et al., "Water harvest via dewing," Langmuir, vol. 28, p. 10183-10191, Published: Jun. 25, 2012.

Seo, et al., "Influence of Geometric Patterns of Microstructured Superhydrophobic Surfaces on Water-Harvesting Performance via Dewing," Langmuir, vol. 30, pp. 15468-15476, Published: Dec. 2, 2014.

Wang, et al., "Biomimetic Water-Collecting Fabric with Light-Induced Superhydrophilic Bumps," ACS Appl. MAtr. Interfaces, vol. 8, pp. 2950-2960, Published: Dec. 13, 2015.

Yang, et al., "A Twice Electrochemical-Etching Method to Fabricate Superhydrophobic-Superhydrophilic Patterns for Biomimetic Fog Harvest," Sci. Rep., vol. 7, No. 8816, pp. 1-12, Published online: Aug. 18, 2017.

Wu, et al., "Efficient and Anisotropic Fog Harvesting on a Hybrid and Directional Surface," Interfaces, vol. 4, 1600801, pp. 1-7, 2017.

Gürsoy, et al., "Bioinspired asymmetric-anisotropic (directional) fog harvesting based on the arid climate plant *Eremopyrum orientate*," Colloids Surf. A, vol. 529, pp. 195-202, 2017.

Venkateshan, et al., "Modelling droplet sliding angle on hydrophobic wire screens," Colloids Surf. A, vol. 598, pp. 310-319, 2018.

Torresin, et al., "Flow Condensation on Copper-Based Nanotextured Superhydrophobic Surfaces," Langmuir, vol. 29, pp. 840-848, Published: Dec. 19, 2012.

Paxson, et al., "Stable Dropwise Condensation for Enhancing Heat Transfer via the Initiated Chemical Vapor Deposition (iCVD) of Grafted Polymer Films," Adv. Mater., vol. 26, pp. 418-423, 2014.

Smith et al., "Droplet mobility on lubricant-impregnated surfaces," Soft Matter, vol. 9, pp. 1772-1780, Accepted: Nov. 20, 2012.

Goodman, Jindra., "The Collection of Fog Drip," vol. 21, No. 3, pp. 392-394, Mar. 1985.

Demoz, et al., "On the Caltech Active Strand Cloudwater Collectors," Atmos Res., vol. 41, pp. 47-62, Accepted: Aug. 27, 1995.

Chen et al., "Anisotropy in the wetting of rough surfaces," Colloid Interface Sci., vol. 281, pp. 458-464, Accepted: Jul. 21, 2004.

Kusumaatmaja, et al., "Anisotropic Drop Morphologies on Corrugated Surfaces," Langmuir, vol. 24, pp. 7299-7308, Apr. 28, 2008.

Furmidge. J., "Studies at Phase Interfaces I. The Sliding of Liquid Drops on Solid Surfaces and a Theory for Spray Retention," Colloid Sci., vol. 17, pp. 309-324, Jun. 15, 1961.

Eral, et al., "Drops on functional fibers: from barrels to clamshells and back," Soft Matter, vol. 7, pp. 5138-5143, Accepted: Jan. 25, 2011.

Protiere, et al., "Wetting on two parallel fibers: drop to column transitions," Soft Matter, vol. 9, pp. 271-276, Accepted: Oct. 8, 2012.

Semprebon, et al., "On the onset of motion of sliding drops," Soft matter, vol. 10, pp. 3325-3334, Accepted: Feb. 3, 2014.

Amrei, et al., "Novel Approach to Measuring the Droplet Detachment Force from Fibers," Langmuir, vol. 32, pp. 13333-13339, Published: Nov. 22, 2016.

Ju, et al., "A multi-structural and multi-functional integrated fog collection system in cactus," Nat. Common. vol. 3, No. 1247, pp. 1-6, 2012.

Ju, et al., "Bioinspired Conical Copper Wire with Gradient Wettability for Continuous and Efficient Fog Collection," Adv. Mat., vol. 25, pp. 5937-5942, 2013.

Cao, et al., "Facile and Large-Scale Fabrication of a Cactus-Inspired Continuous Fog Collector," Adv. Funct. Mater, vol. 24, pp. 3235-3240, 2014.

Malik, et al., "Dew harvesting efficiency of four species of cacti," Bioinspir. Biomim., vol. 10, pp. 1-15, Published: Apr. 24, 2015.

Pan, et al., "The upside-down water collection system of Syntrichia caninervis," Nature Plants, vol. 2, No. 16076, pp. 1-5, 2016.

Xu, et al., "High-Efficiency Fog Collector: Water Unidirectional Transport on Heterogeneous Rough Conical Wires," ACS Nano., vol. 10, pp. 10681-10688, Published: Sep. 30, 2016.

(56) References Cited

OTHER PUBLICATIONS

Xing, et al., "Controlled transportation of droplets and higher fog collection efficiency on a multi-scale and multi-gradient copper wire," RSC Adv., vol. 7, pp. 29606-29610, Accepted: May 22, 2017.

Andrews, et al., "Three-Dimensional Hierarchical Structures for Fog Harvesting," Langmuir, vol. 27, pp. 3798-3802, Published: Mar. 7, 2011.

Sharma, et al., "Investigations on the fog harvesting mechanism of Bermuda grass (*Cynodon dactylon*)," Flora, vol. 224, pp. 59-65, Available online: Jul. 13, 2016.

Bai, et al., "Controlling Water Capture of Bioinspired Fibers with Hump Structures," Adv. Mater., vol. 23, pp. 3708-3711, 2011.

Dong, et al., "Highly Efficient Fog Collection Unit by Integrating Artificial Spider Silks,"Adv. Mater. Interfaces., vol. 3, 1500831, pp. 1-5, 2016.

Duprat, et al., "Wetting of flexible fibre arrays," Nature, vol. 482, pp. 510-513, Feb. 23, 2012.

Shi, et al., "Fog Harvesting with Harps," ACS Appl. Mater. Interfaces, vol. 10, pp. 11979-11986, Published: Nov. 16, 2017.

Shi, et al., "Harps under Heavy Fog Conditions: Superior to Meshes but Prone to Tangling," CS Appl. Mater. Interfaces, vol. 12, pp. 48124-48132, Published: Oct. 6, 2020.

Shi, et al., "Harps Enable Water Harvesting under Light Fog Conditions," Advanced Sustainable Systems, vol. 4, 2000040, pp. 1-10, 2020.

Shi, et al., "Supporting Information—Harps Enable Water Harvesting under Light Fog Conditions," Advanced Sustainable Systems, vol. 4, 2000040, pp. 1-8, 2020.

Kowaski, et al., "Optimizing Fog Harps," ACS Appl. Mater. Interfaces, vol. 13, pp. 38826-38834, Aug. 3, 2021.

Kowaski, et al., "Supplemental Information—Optimizing Fog Harps," ACS Appl. Mater. Interfaces, vol. 13, pp. 1-8, Aug. 3, 2021.

\* cited by examiner

FIG. 3A    FIG. 3B
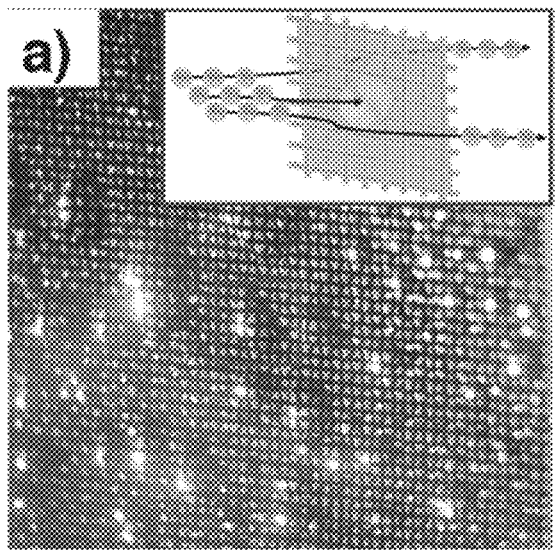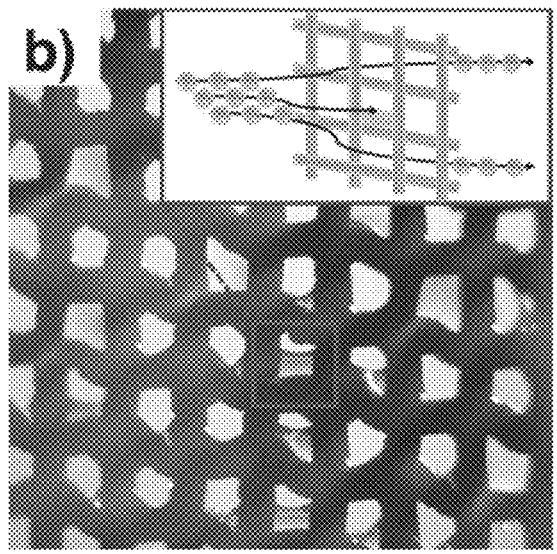
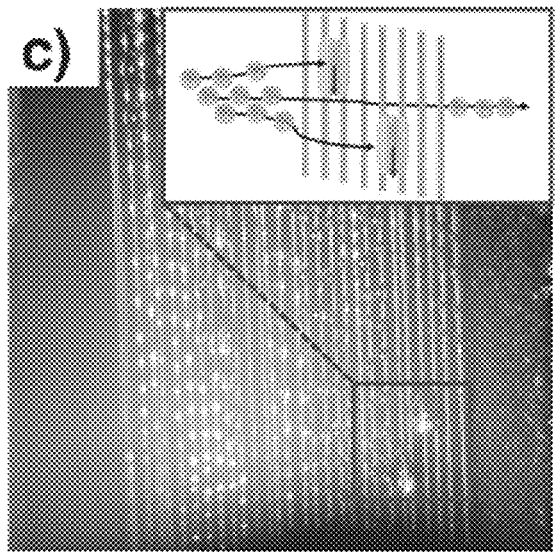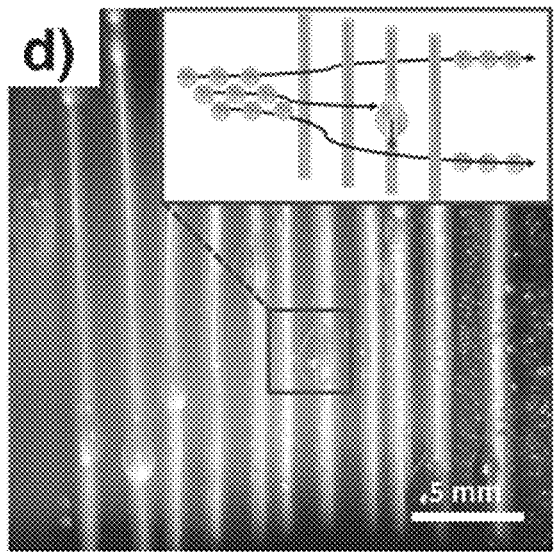
FIG. 3C    FIG. 3D

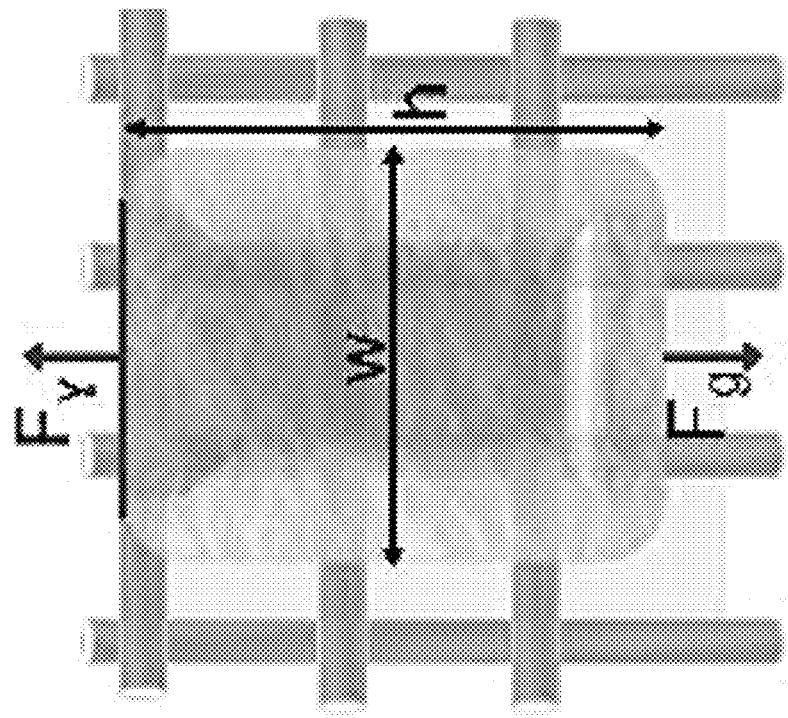
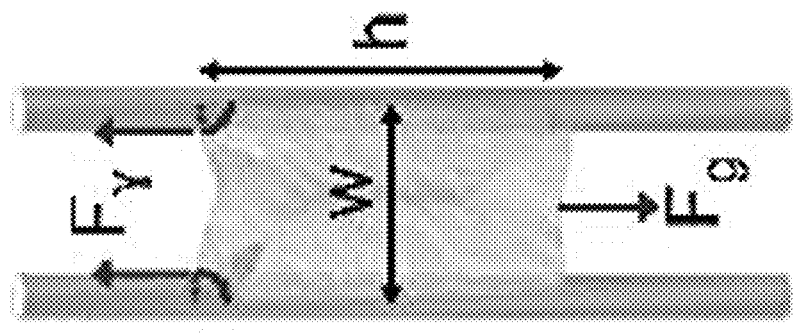
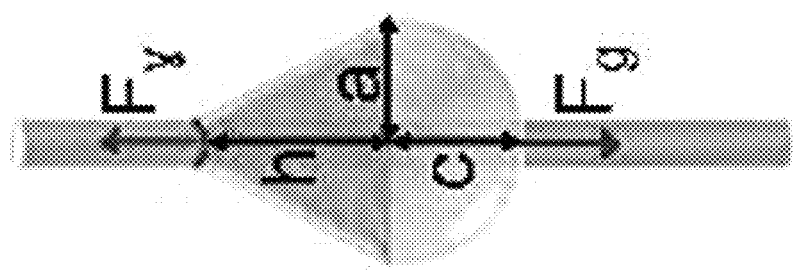
FIG. 4C
FIG. 4B
FIG. 4A

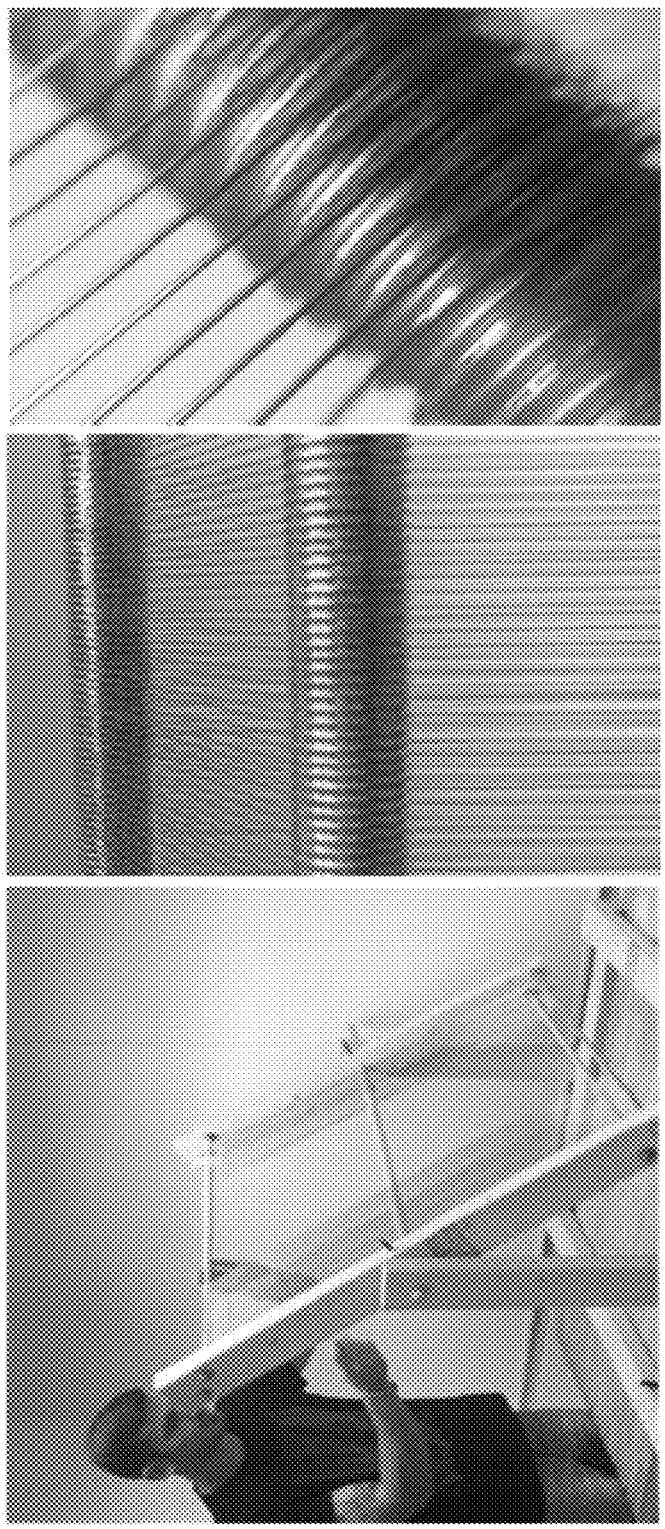

| | Mater. | D (mm) | P/D | SC | St |
|---|---|---|---|---|---|
| H1 | Steel | 0.25 | 2.0 | 0.5 | 0.73 |
| M1 | Steel | 0.23 | 2.2 | 0.7 | 0.79 |
| H2 | Al | 0.51 | 2.0 | 0.5 | 0.36 |
| M2 | Steel | 0.71 | 2.2 | 0.69 | 0.26 |
| H3 | Al | 1.30 | 2.0 | 0.5 | 0.14 |
| M3 | Steel | 1.60 | 2.0 | 0.75 | 0.11 |

FIG. 14

| | $\theta_r$ | $\theta_a$ | $V_{c,t}$ (µL) | $V_{c,e}$ (µL) | $Bo_c$ |
|---|---|---|---|---|---|
| H1 | 33°±3° | 51°±6° | 1.3±0.7 (Eq. 2) | 0.81±0.17 | 0.34 |
| M1 | 33°±3° | 51°±6° | 6±3 (Eq. 5) | 4.1±0.8 | 0.59 |
| H2 | 31°±4° | 50°±2° | 2.6±0.8 (Eq. 2) | 1.8±0.4 | 0.45 |
| M2 | 33°±3° | 51°±6° | — | 5.8±0.8 | 0.66 |
| H3 | 31°±4° | 50°±2° | 3.3±1.0 (Eq. 1) | 2.7±0.3 | 0.51 |
| M3 | 33°±3° | 51°±6° | — | 3.9±0.8 | 0.58 |

FIG. 15

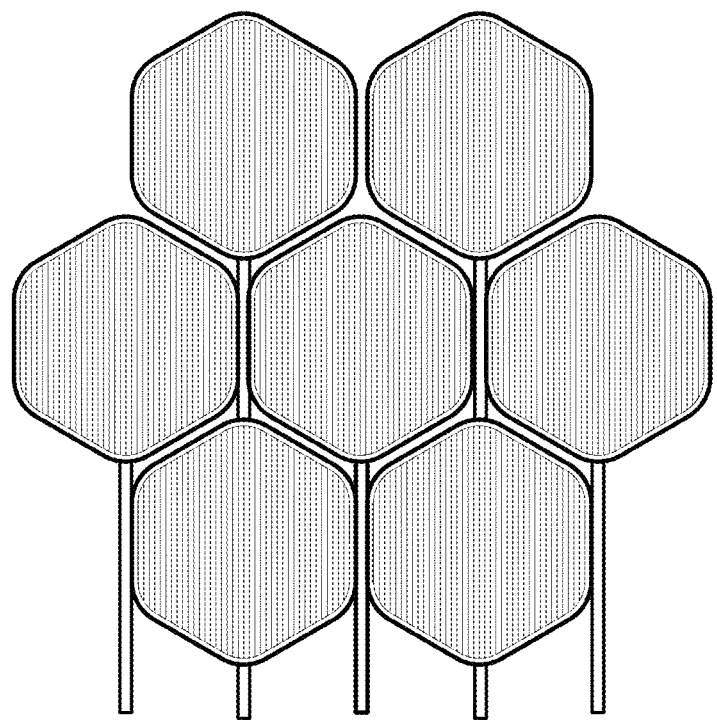
FIG. 20D
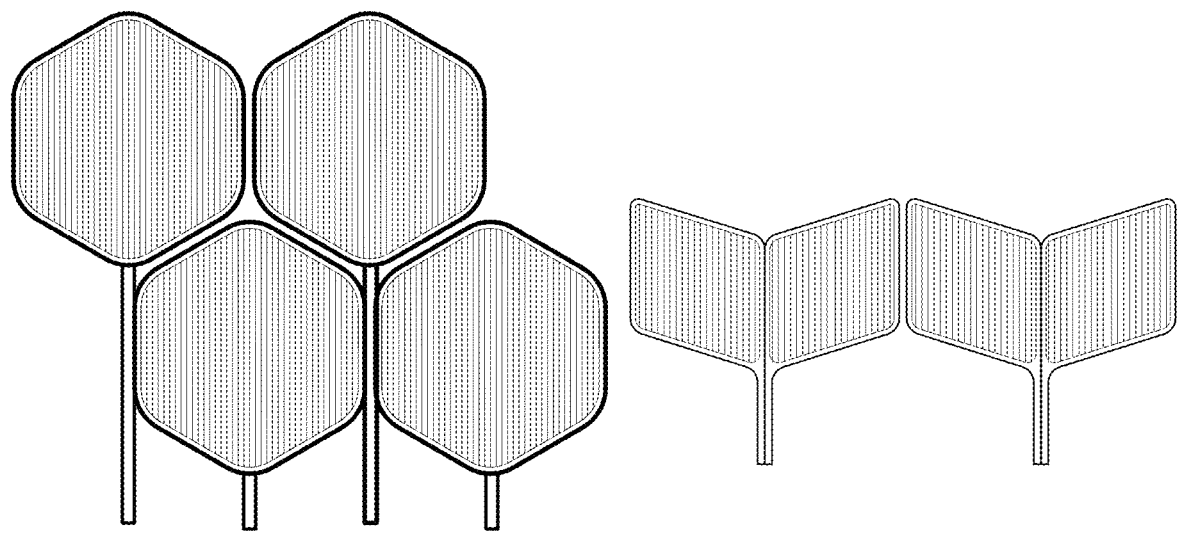
FIG. 20E
FIG. 20F

FOG HARVESTER HAVING A VERTICAL WIRE ARRAY AND USES THEREOF

CROSS-REFERENCE TO RELATED APPLICATIONS

This application is the U.S. National Stage Application under 35 U.S.C. § 371 of Patent Cooperation Treaty Application No.: PCT/US2019/019121, filed on Feb. 22, 2019, entitled "FOG HARVESTER HAVING A VERTICAL WIRE ARRAY AND USES THEREOF," which claims the benefit of and priority to U.S. Provisional Patent Application No. 62/633,750, filed on Feb. 22, 2018, entitled "Fog Harp: Anti-Clogging Fog Harvester Comprised of Parallel Wires," the contents of which are incorporated by reference herein in their entireties.

BACKGROUND

Two-thirds of the world's population faces the specter of water scarcity. Fog harvesting is a useful technique for obtaining fresh water in arid regions. To date, virtually all real-life fog harvesters are composed of mesh netting (5), where fog droplets are caught by the mesh and subsequently fall into a collector after growing to a critical size. Classical mesh design suffers from dual constraints: coarse meshes cannot efficiently capture the micrometric fog droplets suspended in the wind, while fine meshes become clogged which disrupts the aerodynamics of the fog stream. As such, there exists a need for additional fog harvesting techniques and devices.

SUMMARY

Described herein are aspects of a fog harvester that can be composed of a frame; and a vertical wire array that includes wires, wherein the vertical wire array can be coupled to the frame. The wires can be coupled between two threaded rods each having two ends, wherein each wire is parallel to one or more other wires between the two threaded rods and does not cross over any other wire, and wherein the ends of each of the rods are coupled to the frame such that the wires are oriented vertically within the frame. The frame can have a top portion, a bottom portion, and at least two side portions and wherein the ends of the threaded rods can be coupled to the side portions of the frame, wherein one of the threaded rods can be coupled to the side portions of the frame near the top portion of the frame, and wherein the other threaded rod can be coupled to the side portions of the frame near the bottom portion of the frame. The frame can have a collection reservoir in a region of the frame underneath at least a part of the vertical wire array and configured to collect droplets of liquid that collect and slide off of wires the vertical wire array. The collection reservoir can be in the bottom portion of the frame, a side portion of the frame, or the bottom portion and a side portion of the frame. The collection reservoir can be coupled to a hose.

In some aspects, each wire of the vertical wire array can be attached at each end to opposing sides of the frame, wherein each wire is parallel to one or more other wires and does not cross over any other wire. The frame can have a collection reservoir in a region of the frame underneath at least a part of the vertical wire array and configured to collect droplets of liquid that collect and slide off of wires in the vertical wire array. The fog harvester can further include a hose, wherein the hose can be coupled to the collection reservoir.

The shape of frame can form a regular shape. The distance between each wire in the vertical wire array can be substantially the same. In some aspects, the distance between two wires in the vertical wire array can be different than the distance between two different wires in the vertical wire array. The distance between two wires in the vertical wire array can range from about 2 micrometers to about 10 mm. The cross sectional diameter of the each of the wires in the vertical array can range from about 1 micrometer to about 5 mm. The wires can have a surface and wherein the surface can be hydrophobic. The wires can have a surface and wherein the surface can be superhydrophobic. In some aspects, the wires are steel or a steel alloy. In some aspects, the wires are coated with a hydrophobic or superhydorphobic composition.

Also described herein are aspects of a system that can include at least two of the fog harvesters as described herein, wherein the at least two fog harvesters are coupled to each other.

Also described herein are aspects of a structure that includes one or more fog harvesters as described herein, wherein the one or more fog harvesters can be coupled to or integrated with the structure. In some aspects, the structure is a wall.

Also described herein are aspects of a method of collecting fluid droplets from fog or other air source where the method can include the steps of passing the fog or other air source through a fog harvester of as described herein or a system thereof, allowing fluid droplets to form on or between wires of the vertical wire array; and collecting fluid droplets that slide off the wires of the vertical wire array.

BRIEF DESCRIPTION OF THE DRAWINGS

Further aspects of the present disclosure will be readily appreciated upon review of the detailed description of its various embodiments, described below, when taken in conjunction with the accompanying drawings.

FIGS. 3A-3D show photographic images and corresponding illustrations (insets) that encapsulate the performance of each type of fog harvester. FIG. 3A shows fine-scale meshes (M1) and can demonstrate that fine-scale meshes become almost entirely clogged with water, disrupting the aerodynamics of the fog stream. FIG. 3B shows large-scale meshes (M3) and can demonstrate that while they become only partially clogged with water, they are not able to catch a large percentage of the micrometric fog droplets. FIG. 3C shows small-scale (also referred to herein as fine-scale) harps (H1) and can demonstrate that these harps can avoid the constraints of the other systems: they can both capture and drain fog efficiently for maximal performance. FIG. 3D shows large-scale (also referred to herein as coarse-scale) harps (H3) and can demonstrate that large-scale harps can still drain water effectively but can have some drawbacks such as an inefficient capture rate similar to large scale meshes under the particular conditions tested. However, they still performed better than an equivalent large mesh.

FIGS. 4A-4D. FIGS. 4A-4C show illustrations of the three different geometrical scenarios considered for droplet shedding. FIG. 4A considers a droplet sliding down one side of a single vertical wire. FIG. 4B considers a column of water sliding between two adjacent wires. FIG. 4C considers a droplet shedding down a classical mesh structure clogged with water. FIG. 4D shows a graph demonstrating deposition efficiency, aerodynamic efficiency, and overall efficiency with different $R_{wire}$ (μm) values.

FIGS. 6A-6F show photographic images that show (FIG. 6A) a large-scale fog harp wired on a 1 m² frame. The frame can rotate about a central axel for efficient wire winding in a loom-like fashion to thread the wires around threaded rods (FIGS. 6C and 6F). FIGS. 6B and 6D-6E show photographic images of wires wound on threaded rods or laser cut slotted bars in metals or woods to form a vertical wire array. FIGS. 6B and 6D-6E can demonstrate the pitch of the wire can be determined by the pitch of the threaded rods.

FIGS. 11A-11B can demonstrate that on harps H1 and H2, shedding droplets were observed in a column shape between two wires. FIG. 11C can demonstrate that for harp H3, droplets were observed to shed along the side of a single wire.

Figure 12:
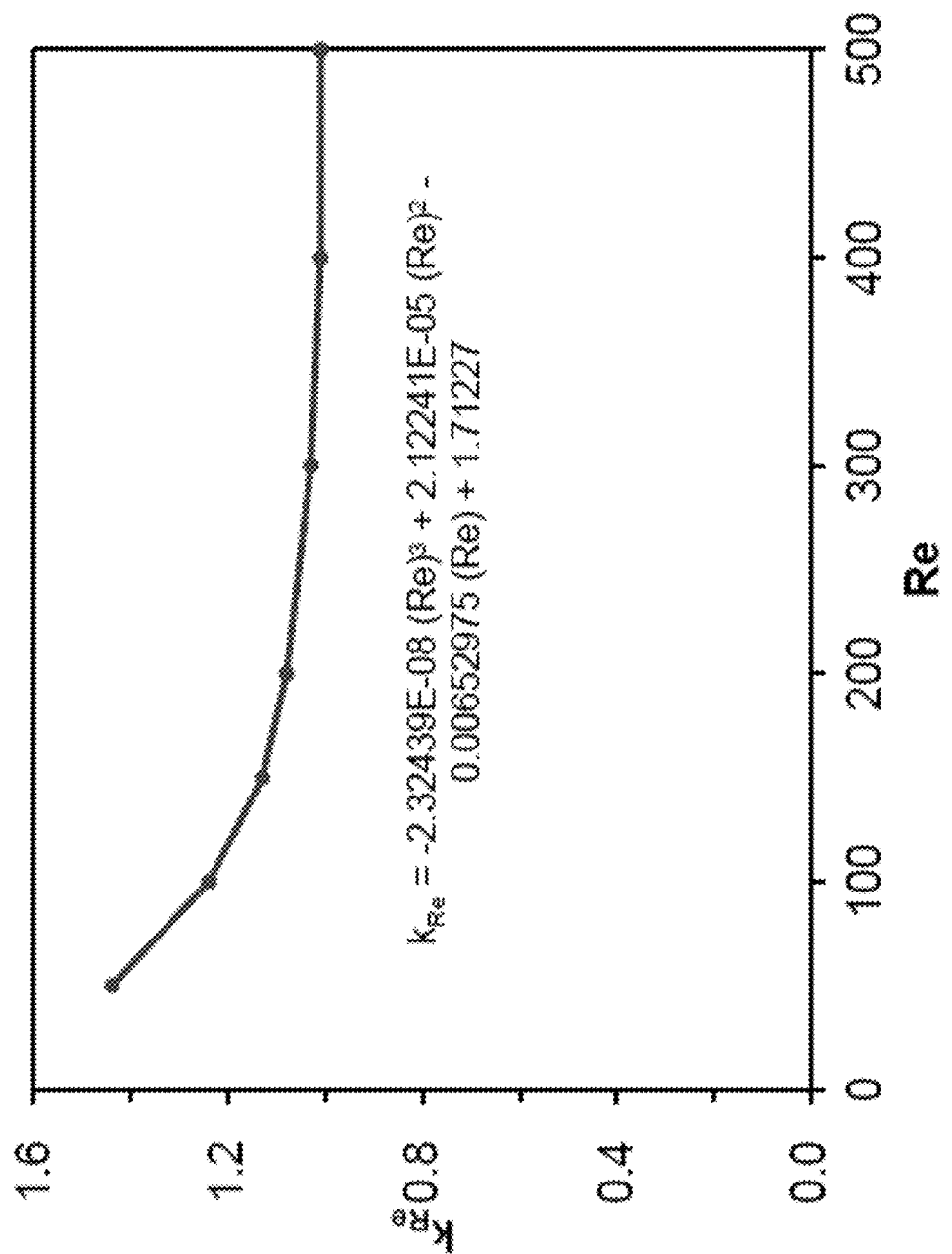
FIG. 12 shows a graph that can demonstrate a correction factor for the pressure drop coefficient of a fog harvester ($C_0$, ($C_0$, see Eq. 4), for metal wires $$C_0 = k_{Re}\left[1.3SC + \frac{SC^2}{1-SC}\right],\quad \text{(Eq. 6)}$$

$R_e<400$. Data points represent measured values from Furmidge. J. Colloid Sci. 1962, 17, 309-324, which are connected by a line of best fit shown in FIG. 12.

Figure 13:
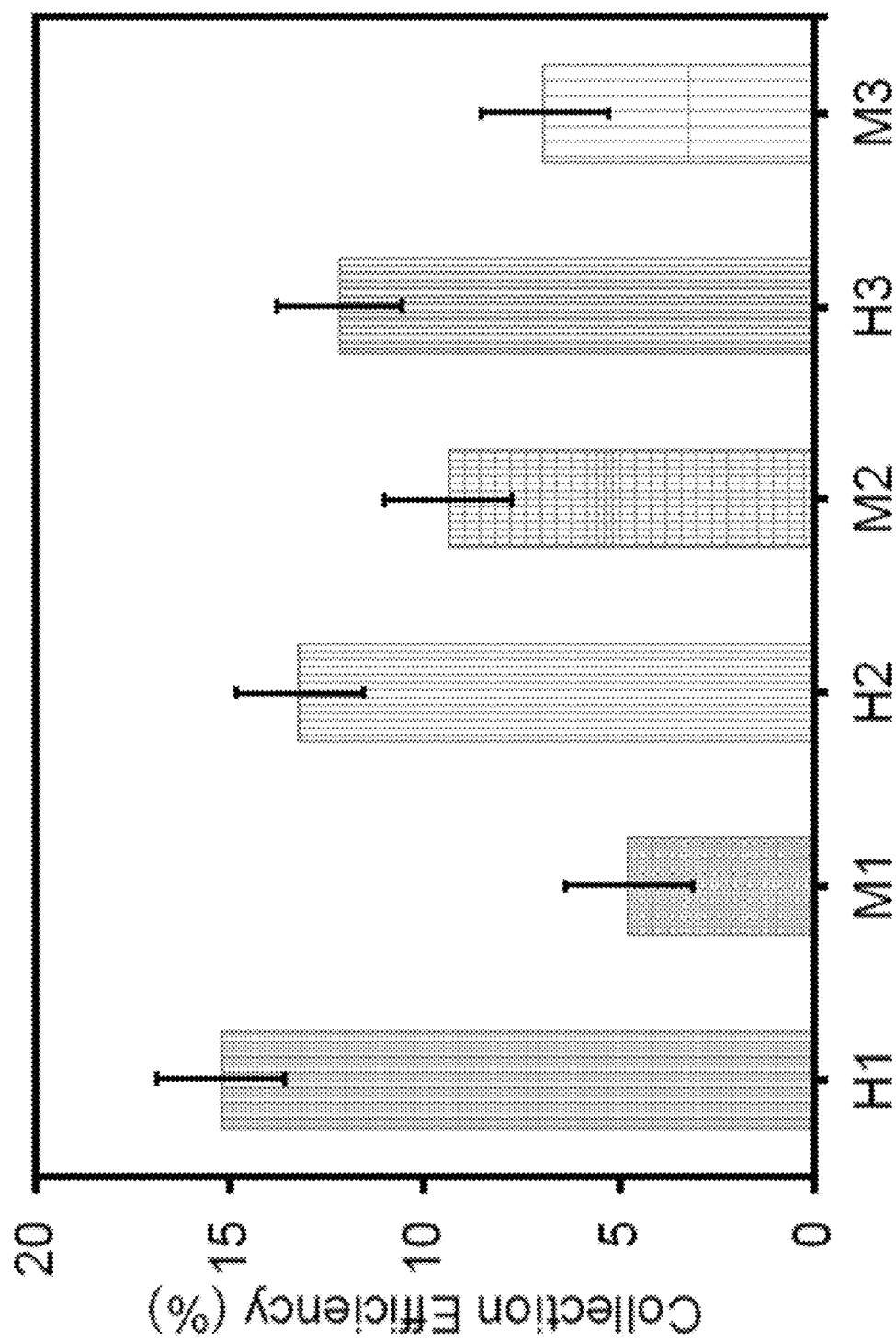

FIG. 13 shows a graph that can demonstrate the collection (or capture) efficiency of fog for each material choice, found by comparing the mass flow rate of the humidifier to the mass flow rate harvested by the harp/mesh. Note that these efficiencies may be artificially low by a small margin, as the fog steam expanded to a slightly larger size than the harps/meshes tested and any fog collected by the frame around the wires was not counted.

FIG. 14 shows a table that contains a summary of the wire material, wire diameter (D), ratio of the center-to-center pitch (distance) between wires to the wire diameter (P/D), shade coefficient (SC), and Stokes number (St) for each of the harps (H1-H3) and meshes (M1-M3) used in Example 1.

FIG. 15 shows a table showing the receding and advancing contact angles ($\Theta_r/\Theta_a$) and the crucial values of the theoretical volume ($V_{c,t}$), experimental volume ($V_{c,e}$), and Bond number for droplet sliding to occur on the three fog harps (H1-H3) and equivalent meshes (M1-M3). Values of contact angles and volumes represent averages of five trials and uncertainty corresponds to plus/minus two standard deviations.

Figure 16:
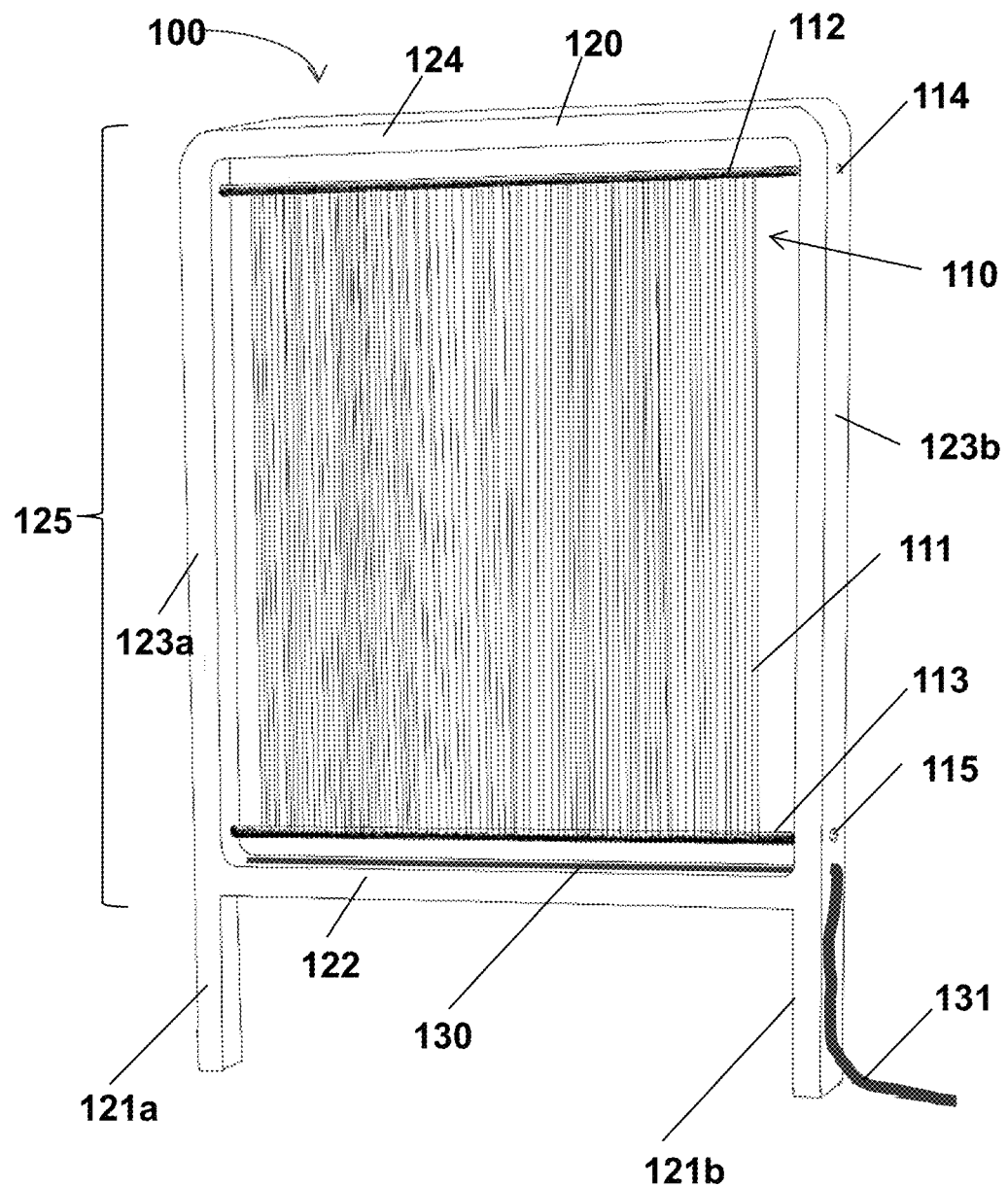

FIG. 16 shows aspects of a fog harvester having a vertical wire array as described herein.

Figure 17:
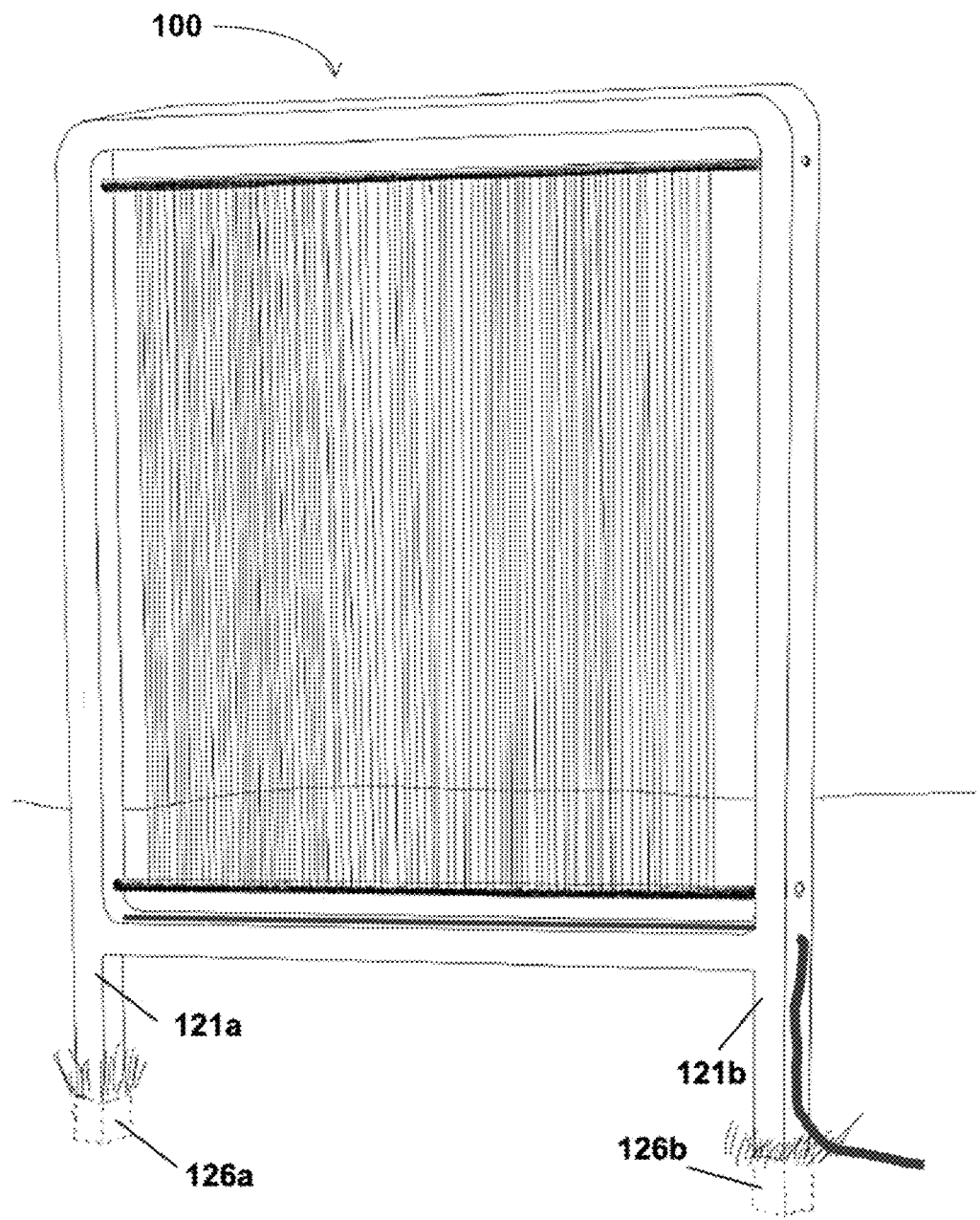

FIG. 17 shows aspects of a fog harvester having a vertical wire array placed in the ground as described herein.

Figure 18:
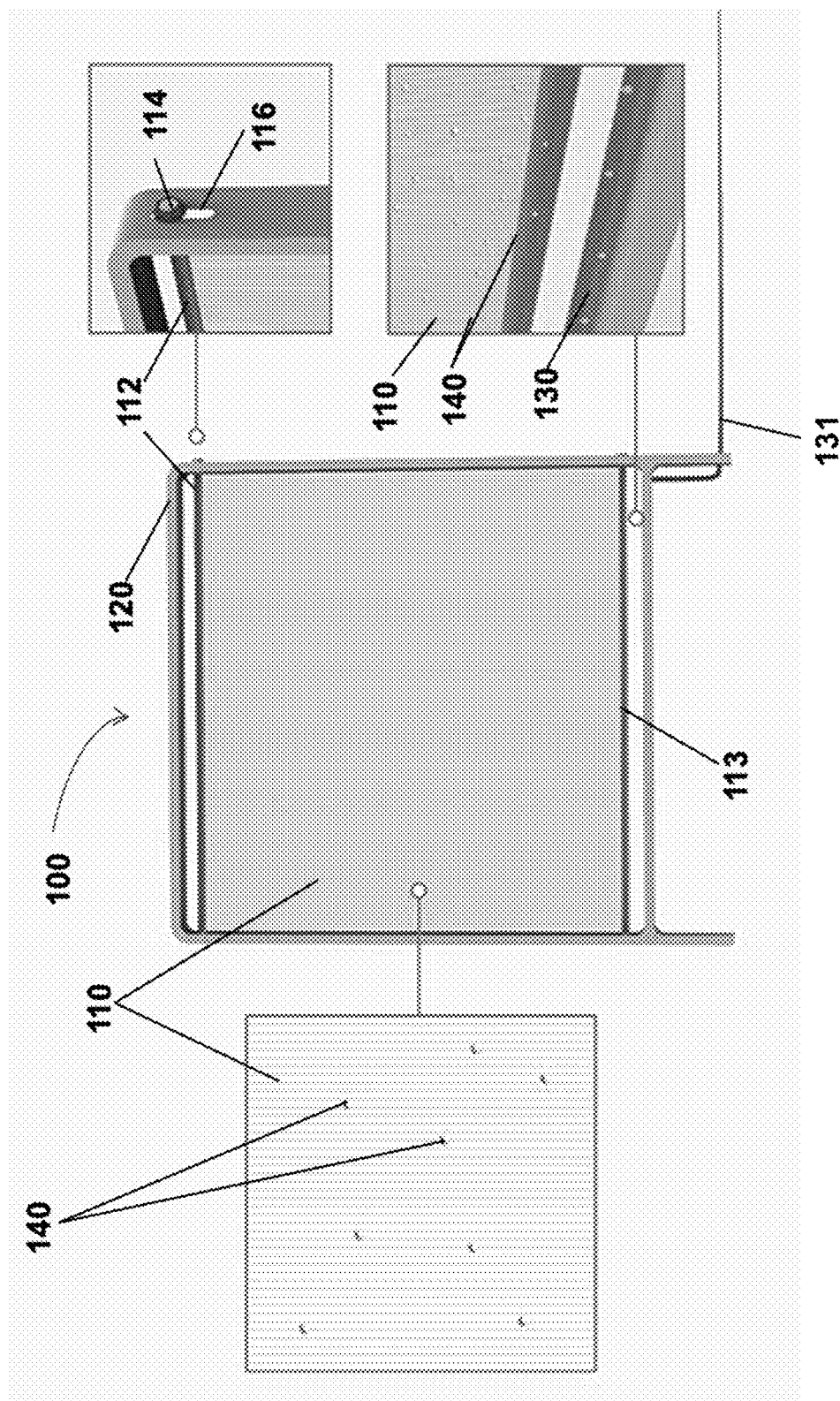

FIG. 18 shows aspects of a fog harvester having a vertical wire array as described herein.

Figure 19A:
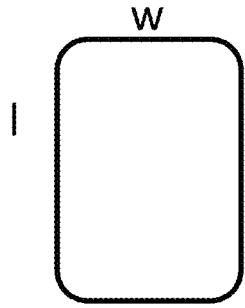
Figure 19B:
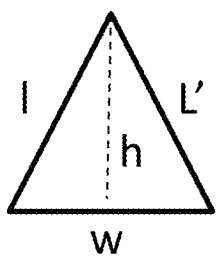
Figure 19C:
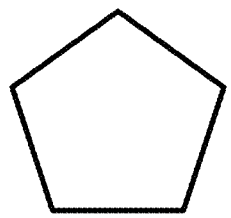
Figure 19D:
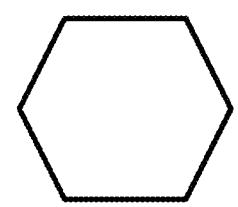
Figure 19E:
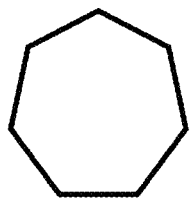
Figure 19F:
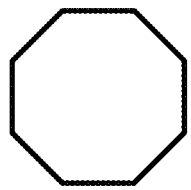
Figure 19G:
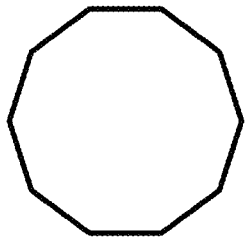
Figure 19H:
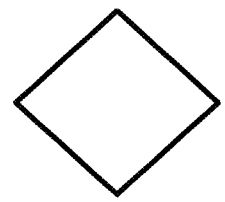
Figure 19I:
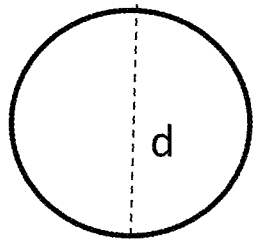
Figure 19J:
Figure 19K:
Figure 19L:
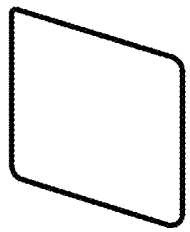
Figure 19M:
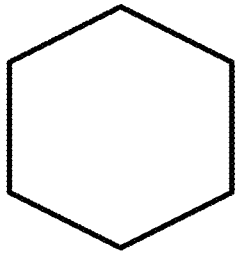
Figure 19N:
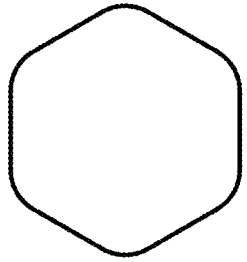
Figure 19O:
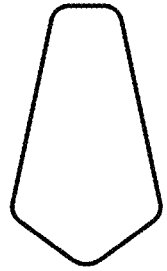
Figure 20A:
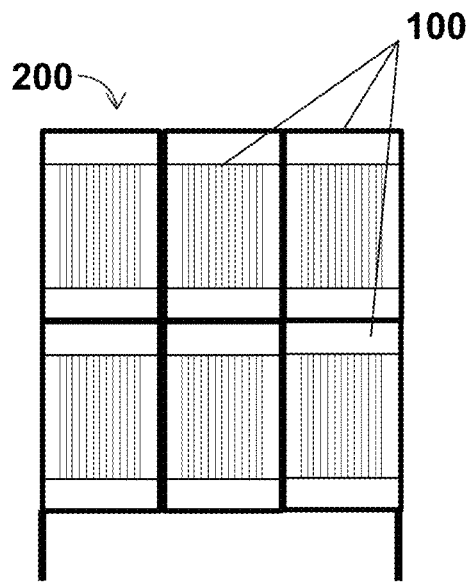
Figure 20B:
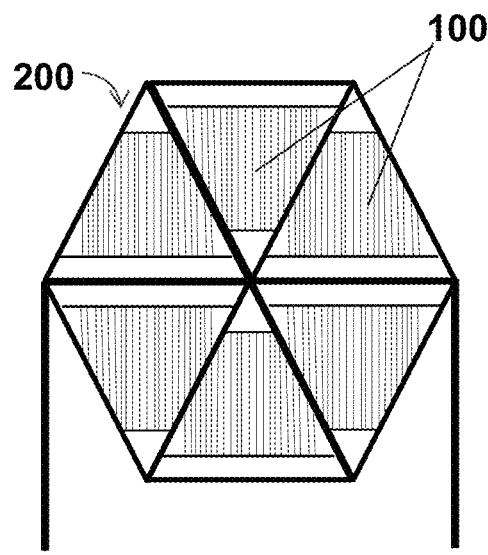
Figure 20C:
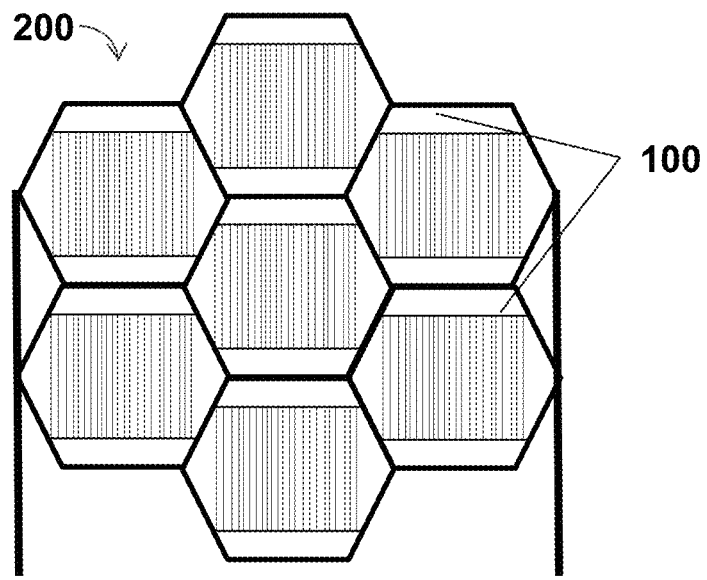

FIGS. 19A-19O show various aspects of the general shapes of a frame for a fog harvester described herein.

FIGS. 20A-20F show fog harvester systems that can include multiple fog harvesters described herein.

Figure 21:
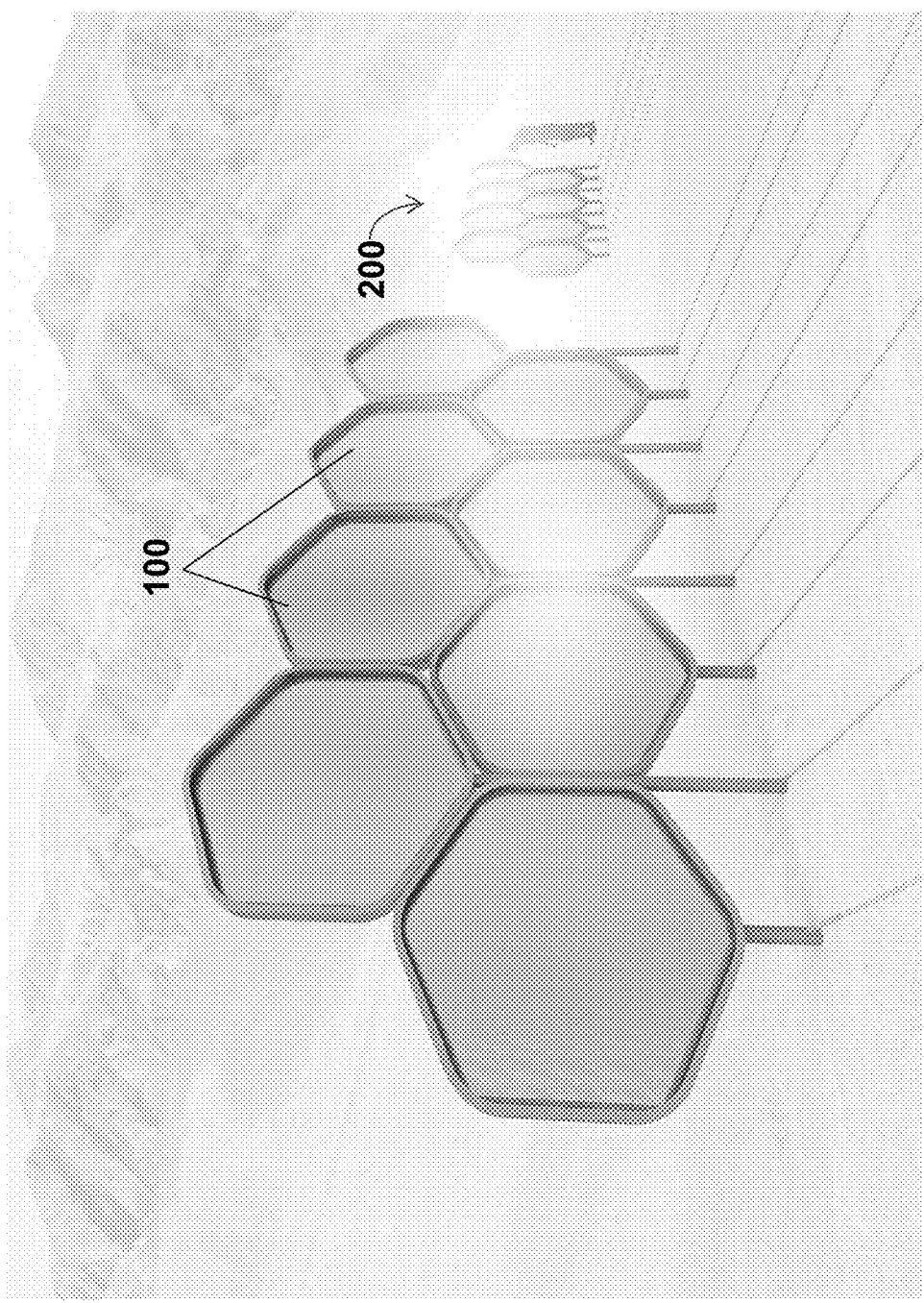

FIG. 21 shows fog harvester systems that can include multiple fog harvesters described herein.

Figure 22:
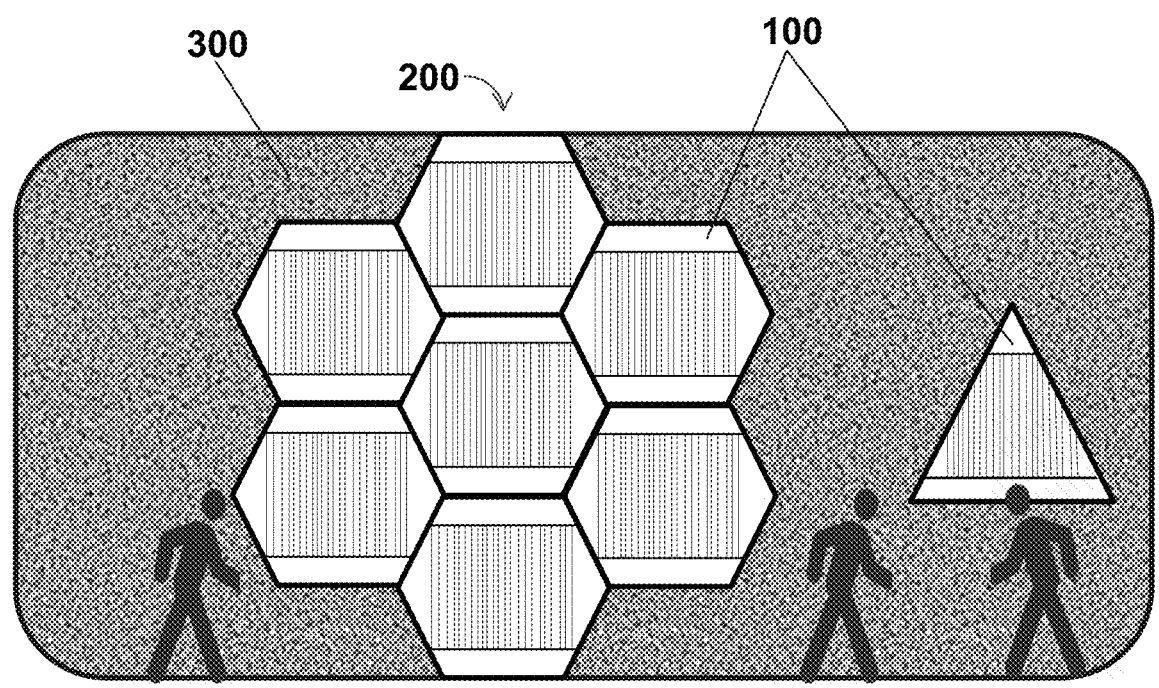

FIG. 22 shows a structure that can incorporate a fog harvester or a system thereof described herein.

Figure 23:
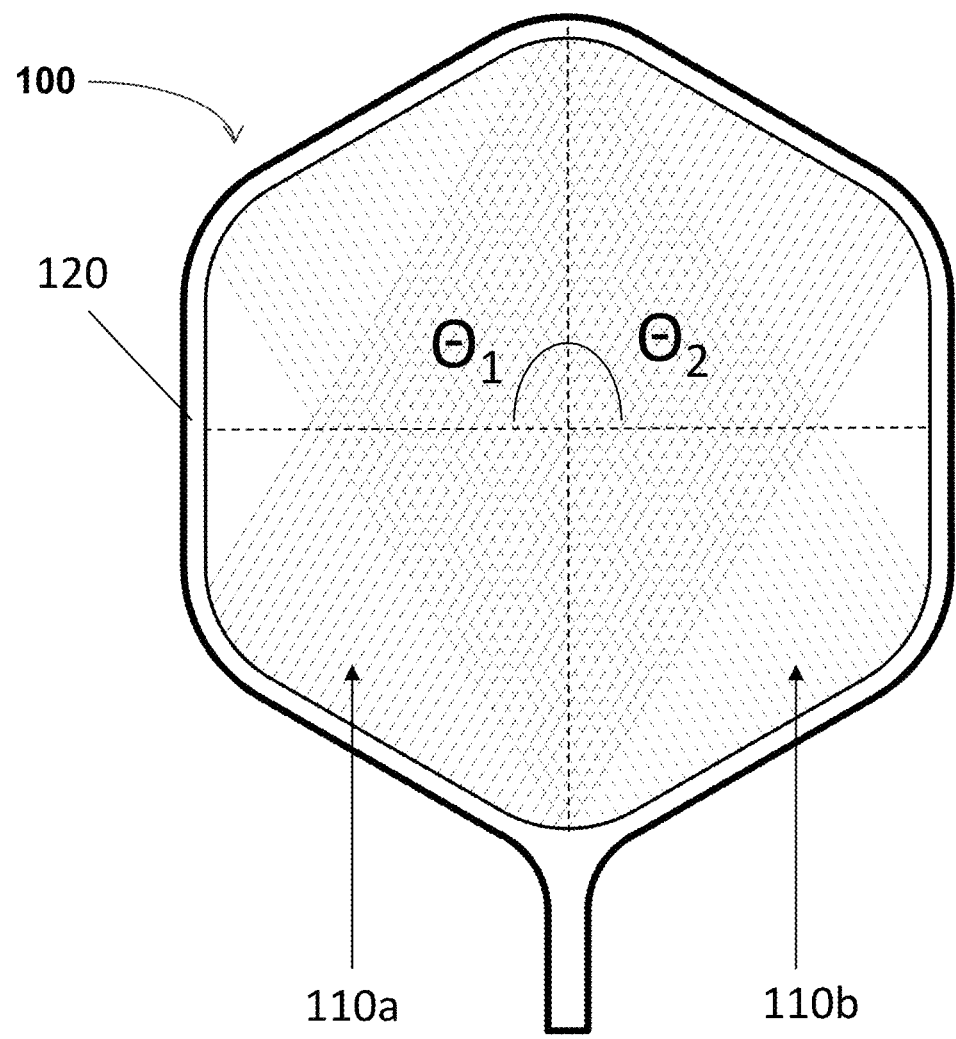

FIG. 23 shows an embodiment of a fog harvester having more than one vertical wire array, one placed behind the other and still configured such that the wires in each array run parallel to each other and still do not cross over each other. Each vertical array is incorporated into the frame of the fog harvester such that the wires can be at an angle from true vertical. The angles can be the same or different but in opposite directions away from true vertical as shown in ($\Theta_1$ and $\Theta_2$) FIG. 23.

Figure 24:
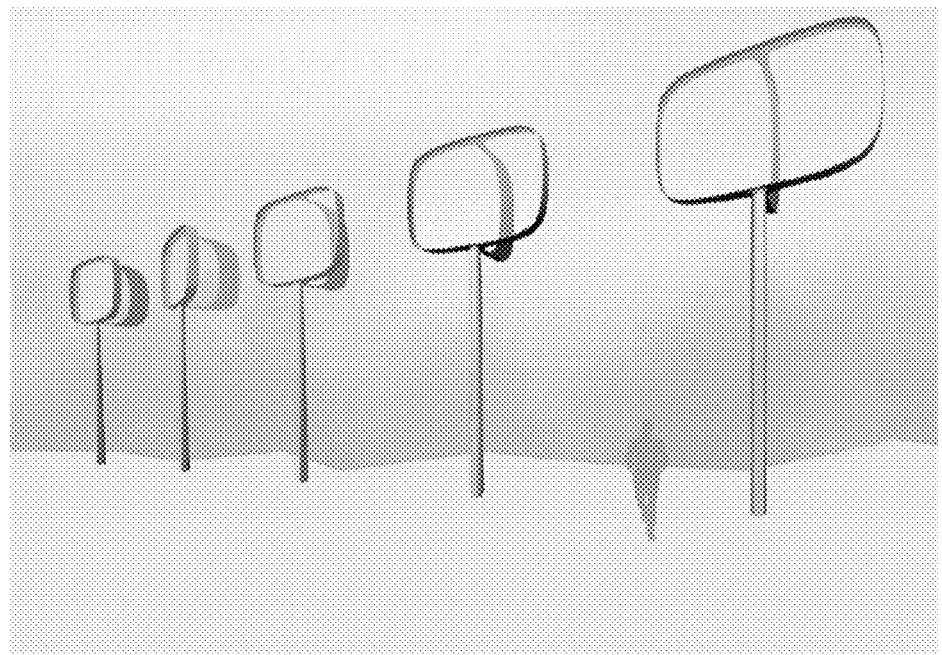

FIG. 24 shows an embodiment of a fog harvester having a vertical wire array in use that is configured to pivot about one or more axes to allow the fog harvester to align the vertical wire array with the direction of the wind, such as a foggy wind.

Figure 25:

FIG. 25 shows an embodiment of a fog harvester having a vertical wire array in use that is configured to pivot about one or more axes to allow the fog harvester to align the vertical wire array with the direction of the wind, such as a foggy wind.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of mechanical engineering, physiochemical engineering, materials science and engineering, industrial engineering, physics and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible unless the context clearly dictates otherwise.

Discussion

Two-thirds of the world's population faces the specter of water scarcity. Fog harvesting is a useful technique for obtaining fresh water in arid regions. To date, virtually all real-life fog harvesters are composed of mesh netting, where fog droplets are caught by the mesh and subsequently fall into a collector after growing to a critical size. Researchers have investigated how the fog harvesting rate is modulated by variations in the geometry and wettability of these mesh structures. It is well known that the classical mesh design suffers from dual constraints: coarse meshes cannot efficiently capture the micrometric fog droplets suspended in the wind, while fine meshes become clogged which disrupts the aerodynamics of the fog stream.

One approach to minimizing clogging for fine meshes is to use superhydrophobic or lubricant-impregnated surface structures, which promote highly mobile Cassie droplets with greatly reduced contact angle hysteresis. Indeed, such approaches have been shown to enhance the drainage and collection rates of fog or dew droplets. However, it is now well known that the thin, conformal hydrophobic coatings required for superhydrophobic surfaces are not durable, particularly under prolonged exposure to the humid conditions inherent to fog harvesters. Lubricant-impregnated surfaces also suffer from durability issues. In particular, the oil tends to cloak the shedding water droplets, which gradually depletes the lubrication layer and could contaminate the collected water.

With at least these deficiencies of current fog harvesting systems and designs in mind, described herein fog harvesters that include one or more wire arrays that contain only vertically oriented wires coupled to a frame. The fog harvester and systems thereof described herein can have enhanced fog collection as compared to fog harvesters having a classical mesh design. Also described herein are methods of making and using the fog harvesters and systems thereof described herein. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Described herein are aspects of a fog harvester and systems thereof that can include a vertical wire array coupled to a frame and systems thereof. As show in FIG. 16, the fog harvester 100 can include a vertical wire array 110 coupled to a frame 120 and oriented within the frame 120 such that wires 111 contained in the vertical wire array 110 are oriented vertically within the frame 120. The vertical wire array 110 can be composed of one or more strands of wire 111 wound between two threaded rods 112, 113. The threaded rods 112, 113 can be coupled to the frame 120 with one being coupled to a top region of the frame (112) and one coupled to the bottom region of the frame (113). The frame 120 can include holes configured to receive the ends of the threaded rods 112, 113. The threaded rods 112, 113 can be coupled to the frame 120 by inserting the ends of the threaded rods into holes (see e.g., FIG. 18, 116) in the frame 120. In some aspects, a suitable fastener or coupler (e.g. a nut, washer, etc.) 114, 115 can be used to secure the threaded rods 112, 113 to the frame 120. It will be appreciated that the threaded rods can be coupled to the frame using other mechanisms, such as welding, or can be manufactured as a fully integrated aspect of the frame. In some aspects, the wires 111 are directly coupled to a top 124 and bottom portion 122 and of the frame and vertically oriented in parallel within in the frame 120 instead of being wound around a threaded rod. In some aspects, some wires can be included in a vertical wire array as described above and some wires can be directly attached to a top and/or bottom portion (122, 124) of the frame 120 (See e.g. FIG. 20B).

The fog harvester 100 can contain a collection reservoir 130. In some aspects, such as that shown in FIG. 16, the collection reservoir 130 can be integrated into a bottom portion or member 122 of the frame 120. In some aspects, the collection reservoir 130 can be a trough formed in a bottom portion or member of the frame 122 extending beneath the bottom of the vertical wire array 110. In some aspects, the collection reservoir 130 can be included in a side member of the frame, such as when the side member is beneath a wire contained in the vertical wire array or a wire that is directly attached to a portion of the frame (see e.g. FIG. 20B). In other aspects, the frame 120 does not include a bottom member extending horizontally between vertical members 123a,b of the frame 120. In these aspects, a collection reservoir can be any container that can be placed under the bottom of the vertical wire array 110. The container forming the collection reservoir in these aspects can be coupled to the frame 120 or can be separate from the frame, such as being placed on or in the ground. The fog harvester 100 can further contain a hose or other fluid conduit or channel 131 that can be physically coupled to or in fluidic connection to the collection reservoir. In some aspects, one or more portions of the frame can be hollow and can allow fluid flow through that portion of the frame. In some aspects, a hose 131 can be passed through or contained in a portion of the frame 120, such as through a hole or through a hollow member or portion of the frame 120. The hose 131 can be used to transport collected fluid from the collection reservoir 130 to another location.

In some aspects, the frame can include anchor members 121a,b that can extend beyond a primary frame body 125. As shown in FIG. 17, the anchor members 121a,b can allow for fixating, coupling, and/or anchoring the fog harvester 100 to the ground or other object (e.g. a wall, fence, building). In some aspects, the anchor members 121a,b can be placed in the ground such that part of the anchor member(s) extend into the ground 126a, b and part of the anchor members remain exposed above ground. In other embodiments, suitable fixation devices and techniques (e.g., cement, bolts, plates, screws, anchors etc.) can be used to couple the anchor members 121a,b to other surfaces where surface penetration or integration is not possible. Such devices and techniques will be instantly appreciated by one of ordinary skill in the art.

The shape of the primary body 125 of the frame 120 can be any suitable shape. Exemplary shapes are shown in FIGS. 16-17 and 19A-19O. It will be appreciated that other regular and irregular shapes beyond those shown herein and within the spirit and scope of this disclosure. Further it will be appreciated that in terms of area or shape, the simple use of the word frame is understood to be referring to the primary body 125 of the frame as opposed to including the shape if features such as anchor members are considered in determining the area or shape of the frame. The primary body 125 of the frame 120 can have an area inside the primary body 125 of the frame 120 ranging from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, to 10 m² or more. Formulas for calculating area based on shape are generally known in the art. It will be appreciated that in aspects where the wires are directly attached to and vertically oriented between bottom and top members (122, 124) of the frame 120, the area of the vertical wire array is substantially the same as the area inside the frame. The frame can be composed of any suitable material(s). Suitable materials include, but are not limited to wood, bamboo, metals (e.g., steel, coated steel, and steel alloys (including, but not limited to, stainless steel, galvanized steel, carbon steel)), aluminum, copper, brass, bronze, plastics, rubbers (e.g., hard rubbers), cement and other stone materials. The frame 120 can be made by any suitable manufacturing technique, including welding, molding techniques, and 3D printing. Such techniques and processes will be appreciated by those of ordinary skill in the art. The frame 120 can be manufactured as a single continuous piece or can be made from multiple pieces that are coupled together to form the final frame 120.

In some aspects, the frame can be configured to allow the fog harvester to pivot along one or more axes, which can allow the fog harvester to align the vertical wire array with the direction of a wind or air/fog flow. In some embodiments, the primary body of the frame can be rotatably coupled to one or more anchor members. The fog harvester can be manually or automatically pivoted in response to wind direction. FIG. 24 shows an embodiment of a fog harvester having a vertical wire array in use that is configured to pivot about one or more axes to allow the fog harvester to align the vertical wire array with the direction of the wind, such as a foggy wind. FIG. 25 shows an embodiment of a fog harvester having a vertical wire array in use that is configured to pivot about one or more axes to allow the fog harvester to align the vertical wire array with the direction of the wind, such as a foggy wind.

The vertical wire array, whether formed from winding wires between two threaded rods or directly attaching the end(s) of one or more wires to a top and/or bottom frame member (e.g., FIG. 16, 122, 124), can have an area that is equal to the area inside the frame or less than the area inside the frame, depending on the configuration. Thus, the vertical wire array can have an area ranging from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, to 10 m² or more. The area of the vertical wire array is considered any area inside the frame that is intersected with wires with the boundaries being the outer most wires (or side members of the frame, depending on the configuration) and from the top and bottom lines formed by the wires (e.g., along the threaded rods or laser cut slotted bars or frame extending between the outer most frame). Formulas for calculating area of a defined region are generally known in the art.

Figure 4D:
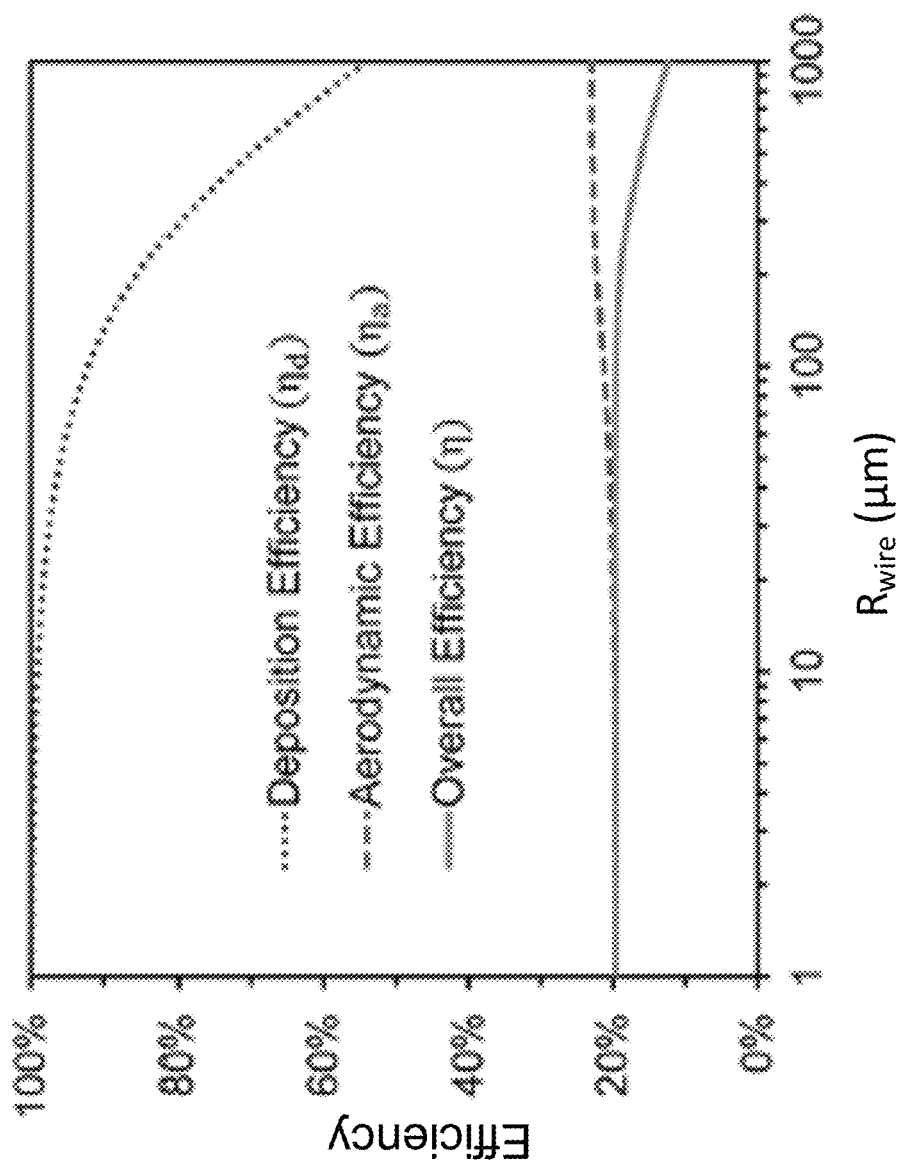

The number of wires in the vertical wire array can depend on the size of the vertical wire array and/or frame, wire gage, and/or distance between the wires (also referred to herein as pitch). The wires forming the vertical wire array can be formed from a single continuous wire wound back and forth between the top and bottom thread rods and/or frame members or can be made of multiple sections of wire coupled to and between the top and bottom thread rods and/or frame members. The wire can have a cross sectional diameter (as measured from the outer most edges) that can range from about 1 micrometer to about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107 108, 109, 110, 111, 112, 113, 114, 115, 116, 117, 118, 119, 120, 212, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 275, 300, 350, 400, 450, 500, 550, 600, 650, 700, 750, 800, 850, 900, 950, 1000, 1500, 2000, 2500, 3000, 3500, 4000, 4500 to 5000 micrometers or more. It will be appreciated that wire cross sectional diameter that can be any and all of the integers between each of these numbers (e.g., 4.1, 4.2, 4.3 10.9, 56.8 etc.) and any range falling within two numbers within the overall described range. In some aspects, the cross section diameter is less than 300 micrometers, less than 250 micrometers, less than 200 micrometers, less than 175 micrometers, less than micrometers, less than 150 micrometers, less than 100 micrometers, less than 75 micrometers, less than 50 micrometers, or less than 25 micrometers. In some aspects, the cross sectional diameter can range from about 0.1 mm to about 5 mm, about 0.1 mm to about 3 mm. 0.1 mm to about 1 mm, 0.1 m to about 0.5 mm, or about 0.1 mm to about 0.25 mm. There are two main aspects to overall efficiency of the vertical wire array, and thus the fog harvester. The two main aspects are: deposition efficiency $$\left(\eta_d = \frac{St}{St + \pi/2}\right),$$ (Equation 3)

which is a function of the Stokes number, and aerodynamic efficiency $$\left(\eta_a = \frac{SC}{1 + (C_0/C_d)^{1/2}}\right);$$ (Equation 4)

the overall efficiency $\eta = \eta_a \eta_d$ (see FIG. 4D). With increasing wire size, the aerodynamic efficiency is increasing but deposition efficiency is decreasing, which resulting in a plateau for overall efficiency at around wire radius of 100 μm.

The wire(s) can be made of any suitable material. Suitable wire materials include but are not limited to steel and steel alloys, copper, aluminum, any other suitable elemental metal, metal composite, or metal alloy, polyesters, nylon, rayon, any other suitable polymer or plastic, Teflon, any fiber material, carbon fiber, and any suitable combination thereof. In some aspects, the wires are not coated. It can be an advantage of the fog harvester design that it can be operated without coated wires. In some aspects, the wires can be coated with a material that can protect the wires from destruction from environmental elements. The wires can be coated with a material that can alter the hydrophobicity of the wire surface. In some aspects, the wires can be coated with a hydrophobic or superhydrophobic material. In some aspects, one or more of the wires can be coated with a composition such as a fluoro-silane, alkyl-thiol, Teflon, natural waxes (e.g. beeswax), etc. The pitch of the wires in the vertical wire array can range from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, to 10 mm or more. It will be appreciated that wire cross sectional diameter that can be any and all of the integers between each of these numbers (e.g., 4.1, 4.2, 4.3 7.2, 8.4 etc.) and any range falling within two numbers within the overall described range. In some aspects, the pitch (as measured from center to center of two adjacent wires in the vertical wire array can be about 2 times the cross sectional diameter of the wires. For example, if the wires have a cross-sectional diameter of about 250 micrometers, then the center-to-center pitch can be about 500 micrometers. Then in some aspects, the threaded rods can include threads that have grooves that are about the same as the pitch. Stated differently and as shown in FIGS. 6B and 6D-6F, the threads of the threaded rods can be used in some aspects to generate the pitch of the wires in the vertical wire array. In some aspects, the pitch between each wire in the vertical wire array can be substantially the same. In some aspects, the pitch between two wires in the vertical wire array can be different than the distance between two different wires in the vertical wire array.

In some aspects, the vertical wire array can be coupled to the frame such that the wires run completely vertical (see e.g. FIGS. 16-17) In aspects, the vertical wire array can be coupled to the frame such that the parallel wires in the vertical wire array still run parallel but at an angle away from true vertical The angle as measured from true vertical can vary from 0 (true vertical) to an angle less than 90 degrees. In some aspects, the fog harvester can have more than one vertical wire arrays (e.g. 2, 3, 4, 5, 6, 7, 8, 10 or more) placed in series with one behind the other. In all cases, the wires within each array and the wires in different arrays do not touch each other. As such, no "mesh" structure is formed by the inclusion of multiple vertical wire arrays. Like the fog harvesters with a single vertical wire away, each of the vertical wire arrays in fog harvesters having more than one vertical wire array can be at any angle as measured away from true vertical from 0 (the parallel wires are vertical) to any angle less than 90 degrees. FIG. 23 shows aspects of a fog harvester having more than one vertical wire array, where each of the vertical wire arrays are at an angle away from vertical. In some aspects, the additional vertical wire arrays can add strength to the fog harvester. In some aspects the additional vertical wire arrays can add visual interest.

In some aspects and also described elsewhere herein, the vertical wire array can be formed by winding wire around between one or more threaded rods. In some aspects, the frame can be placed on a central rotating rod and rotated around the central axis while guiding the wire into the correct thread on the threaded rod (see e.g. FIGS. 6A-6F). It will be appreciated that any other manufacturing technique to wind the wire around one or more threaded rod and/or directly couple the wire to a portion of the frame by those of ordinary skill in the art and are within the spirit and scope of this descriptor. Assembly of the vertical wire array can be completed by humans and/or machines, including but not limited to robotic arms or other assembly machines.

In some aspects, a single fog harvester 100 having a vertical wire array described herein can stand alone and be connected to other fog harvesters (including those described herein and others known to those of ordinary skill in the art) only via feeding into a common collection reservoir or via a common hose. In other aspects, multiple fog harvesters having a vertical wire array described herein can be coupled together such that one or more portions of the frame can come in contact with one another to form fog harvester systems 200 that can include two or more fog harvesters having a vertical wire array described herein (see e.g., FIGS. 20A-20F and 21). Fog harvesters 100 in a fog harvester system 200 can also be coupled together via feeding into a collective hose and/or collection reservoir. Any number of fog harvesters described herein can be coupled together as is desired or practically feasible. In some aspects, one or more fog harvesters having a vertical wire array or systems thereof described herein can be incorporated into a structure 300 (e.g. a wall, fence, or any other physical structure) for aesthetic and/or functional purposes (e.g. a separation screen) (see e.g. FIG. 22).

In operation, fog droplets or air containing liquid microdroplets can pass through the vertical wire array 110 of a fog harvester 100 described herein. As shown in e.g., FIG. 18, fog droplets or air containing liquid microdroplets can collect on the surface of a wire and/or between two or more parallel wires of the vertical wire array 110 and form liquid droplets on the vertical wire array 110. When a droplet on the vertical wire array reaches a critical droplet size or volume, the droplet can slide down the wire(s) and drip off the bottom end of the vertical wire array 110. The critical droplet size or volume is the droplet size or volume at which the droplet begins to slide down the wire(s). The critical droplet size or volume can vary depending on the material of the wire, the hydrophobicity of the wire surface, and other factors. Depending on the wire pitch, the critical droplets slide down on a single wire or two wires. If the wire pitch is small, the critical droplets slide down on one single wire, the equation is $\rho_{water}gV_{c,t} \approx \pi R_{wire}\gamma(\cos\theta_r - \cos\theta_a)$ (Equation 1); if the critical droplets slide down two adjacent wires, the equation for the critical volume is $\rho_{water}gV_{c,t} \approx 2\pi R_{wire}\gamma(\cos\theta_r - \cos\theta_a)$ (Equation 2). In some aspects, the critical droplet size or volume can range from 0.1 µL to 5 µL for critical droplets sliding down one single wire and 0.1 µL to 10 µL for critical droplets sliding down two adjacent wires, both based off the wire radius of 1 mm. The droplets that drip from the vertical wire array can fall into a collection reservoir 130 placed underneath the vertical wire array. The collected water can then be further moved into hosing and other collection or storage containers/reservoirs for later use or be immediately used. The collected water can be used for any purpose, including but not limited to irrigation, industrial uses, and drinking water. In some aspects, the water can be further treated after collection as desired.

The fog harvesters described herein can have an increased efficiency and/or rate of liquid collection as compared to fog harvesters having a mesh design. In some aspect the efficiency and/or rate of liquid collection can be increased 1-300 or more fold as compared fog harvesters having a mesh design.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1

Introduction. Two-thirds of the world's population faces the specter of water scarcity. (1) Fog harvesting is a useful technique for obtaining fresh water in arid regions. (2-4) To date, virtually all real-life fog harvesters are composed of mesh netting (5), where fog droplets are caught by the mesh and subsequently fall into a collector after growing to a critical size. Researchers have investigated how the fog harvesting rate is modulated by variations in the geometry and wettability of these mesh structures. (6-16) It is well known that the classical mesh design suffers from dual constraints: coarse meshes cannot efficiently capture the micrometric fog droplets suspended in the wind, while fine meshes become clogged which disrupts the aerodynamics of the fog stream. (6, 15-18)

One approach to minimizing clogging for fine meshes is to use superhydrophobic or lubricant-impregnated surface structures, which promote highly mobile Cassie droplets with greatly reduced contact angle hysteresis. Indeed, such approaches have been shown to enhance the drainage and collection rates of fog or dew droplets. (6-8 and 19-25) However, it is now well known that the thin, conformal hydrophobic coatings required for superhydrophobic surfaces are not durable (26-27), particularly under prolonged exposure to the humid conditions inherent to fog harvesters. Lubricant-impregnated surfaces also suffer from durability issues. In particular, the oil tends to cloak the shedding water droplets, which gradually depletes the lubrication layer and could contaminate the collected water (7, 28).

In this Example, a fog harvester (also referred to herein as a "fog harp") composed of an array of fine, vertically orientated wires that simultaneously bypasses the clogging constraint of conventional meshes and the poor durability of non-wetting surfaces. The vertical wires running parallel to the drainage pathway serve to reduce the pinning force of captured droplets, such that droplets can shed at small Bond numbers to prevent clogging. As a result, harps comprised of micrometric wires can efficiently capture fog while simultaneously avoid clogging, which is not possible with conventional mesh structures. As discussed in greater detail herein, up to a 300 percent enhancement in the fog harvesting rate for the fog harps described herein as compared to an equivalent conventional mesh netting, which was far superior to the 50 percent enhancement reported when making a mesh superhydrophobic (8). Both experimental and theoretically there is not a performance ceiling for the fog harps described herein, which can suggest that further enhancement is possible by scaling the wires down to smaller sizes.

Figure 7:
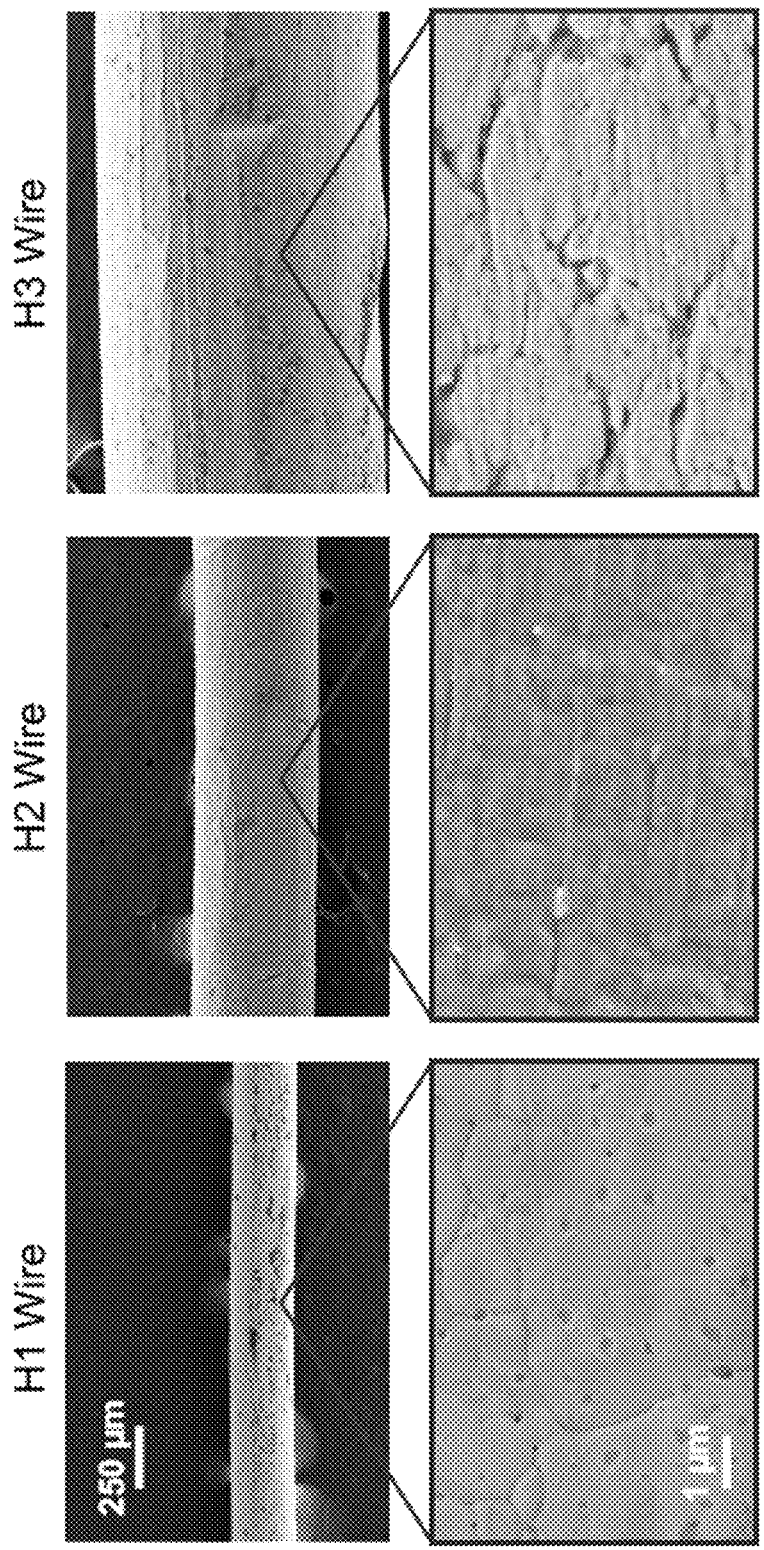
FIG. 7 shows a panel of scanning electron micrographs of the three types of untreated wires used for harps H1 (left images), H2 (middle images), and H3 (right images). In each case, the wires are smooth on a micro-level (top images) and only exhibit some nano-roughness (bottom images).

Fog Harp Fabrication First, two-piece acrylic frames were made via laser-cutting and the two pieces were connected together with threaded bolts. A long, uncoated metal wire was then repeatedly threaded through an array of holes in the top and bottom of each frame to produce two staggered arrays of exposed vertical wires. The wires were either composed of steel or aluminum (depending upon commercial availability for a given wire diameter) but exhibited similar wettabilities and were microscopically smooth (FIG. 7). To hold the vertical wires under tension, stainless steel nuts located on the threaded rods were used to increase the spacing between the top piece and bottom piece of the acrylic frame. Finally, two different 3D-printed plastic pieces were snapped onto the top and the bottom halves of the frame and spray-coated with a superhydrophobic treatment (e.g., Rust-Oleum Never Wet). The lower piece helped the droplets to shed into a collecting reservoir after they reach the bottom of the exposed wires. The upper piece served to redirect any fog that was captured above the exposed wires away from the reservoir. This aspect of the design allowed the focus to be on the fog harvesting performance of the wires themselves.

Methods

Figure 8:
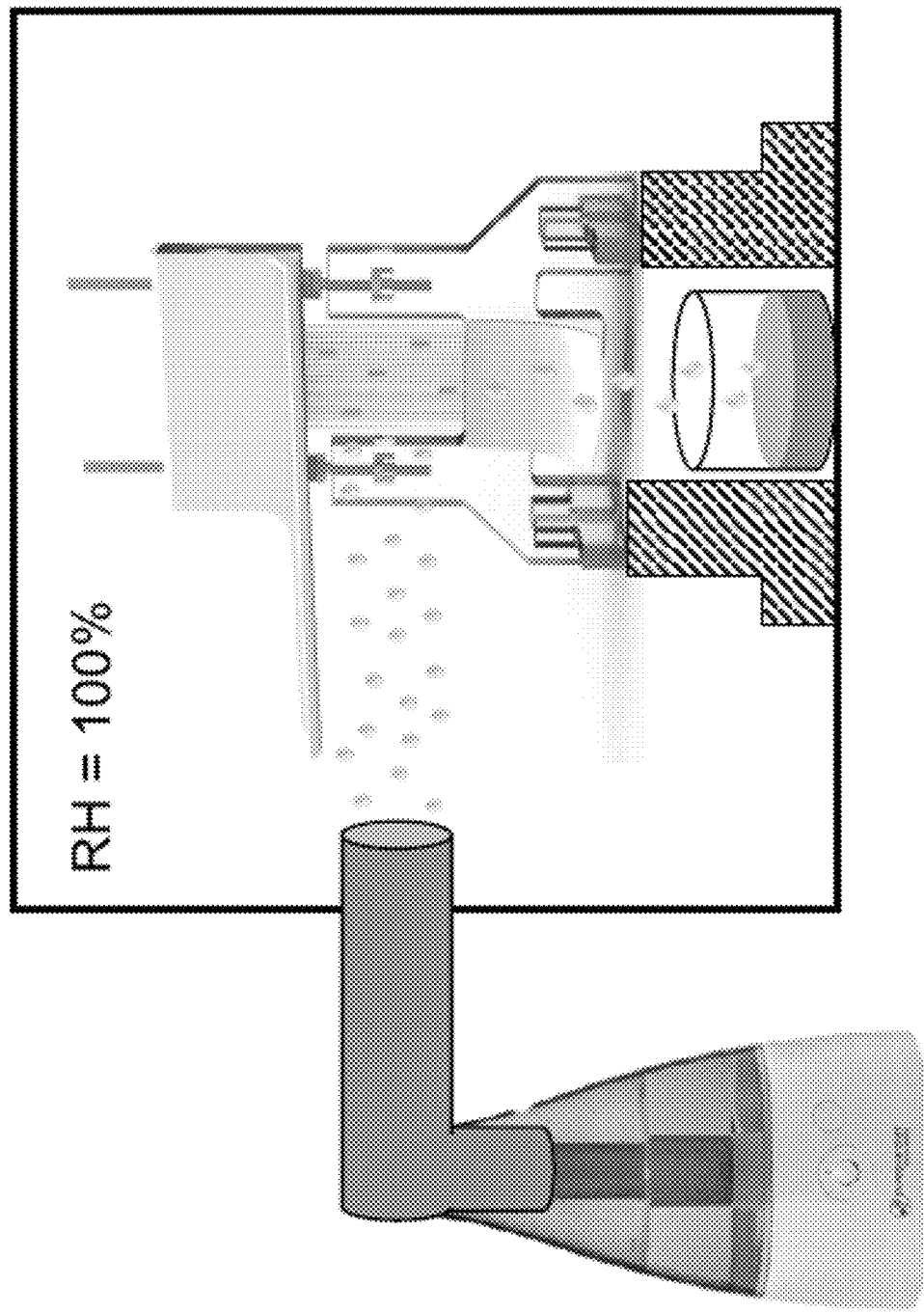
FIG. 8 shows a schematic of the experimental setup used to conduct the fog harvesting experiments within a humidity chamber held to 100% relative humidity described in Example 1.

To obtain controlled measurements of fog harvesting rates, test samples placed in an environmental chamber (Electro-Tech Systems, Model 5503) held at room temperature and 100 percent humidity (FIG. 8). The dimensions of the chamber, 61 cm×46 cm×38 cm, were large compared to the dimensions of the wire arrays, which ranged from about 1.9-2.4 cm×4.0-4.5 cm depending upon the sample using tubing. A high-speed camera (Phantom v711) with a high-magnification lens (Canon MP-E1-5X) was used to measure a fog stream velocity of v=0.15 m/s, with an average fog droplet radius of $r_{fog}$=7 µm. The inner diameter of the tubing was about 2.2 cm, similar to the width of the exposed wire array. This way, the entire fog stream was directed toward the face of the exposed wires, which can allow for an estimation of the water capture efficiency of the fog harvester.

Figure 9A:
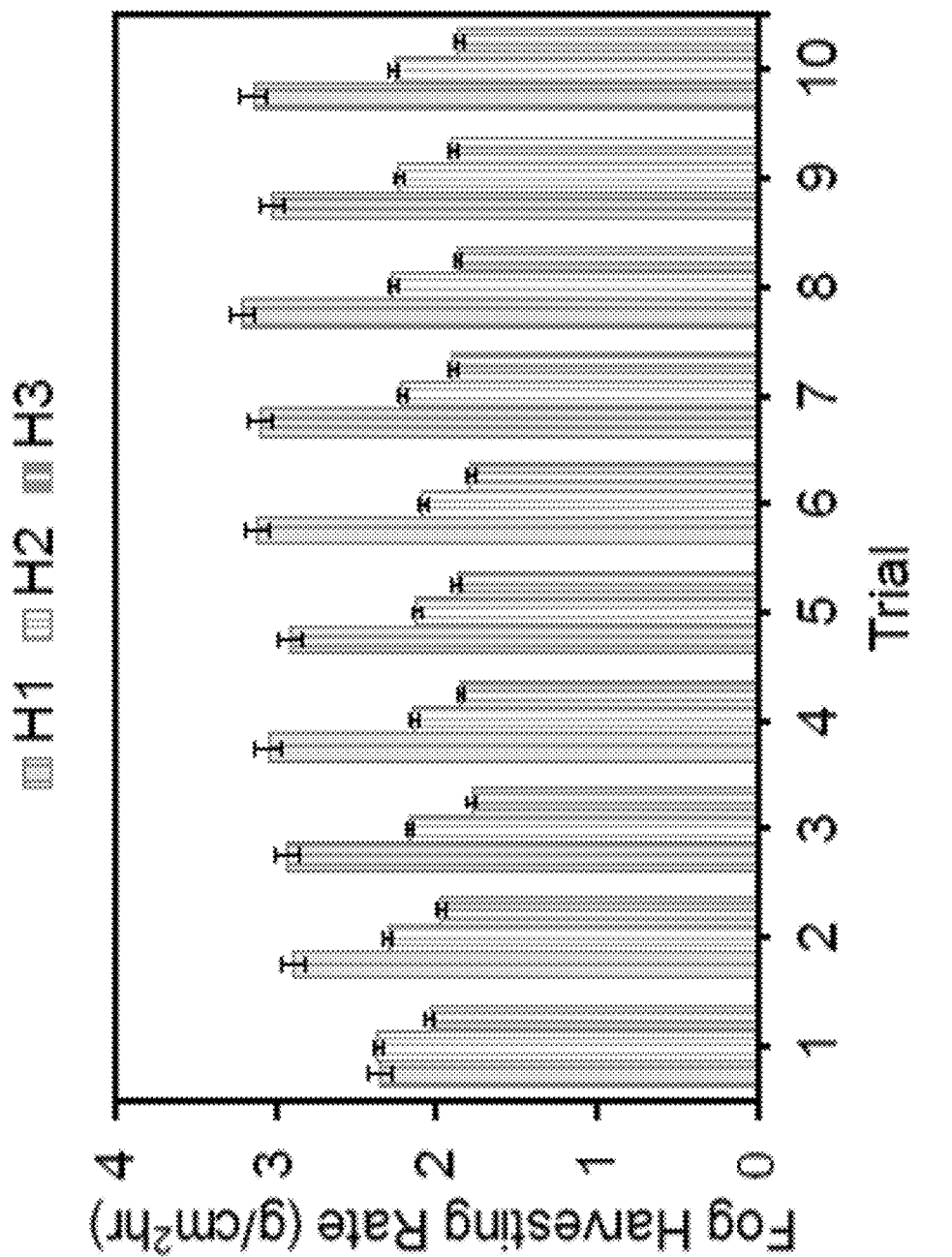
FIGS. 9A-9B show graphs that can demonstrate the fog harvesting rates for (FIG. 9A) harps and (FIG. 9B) meshes as determined by measuring the mass of collected water over ten 30 minute trials. These data can demonstrate that a steady-state harvesting rate was obtained almost immediately. As such, the averaged values depicted in e.g., FIGS. 2A-2B were an average of all ten trials.
Figure 9B:
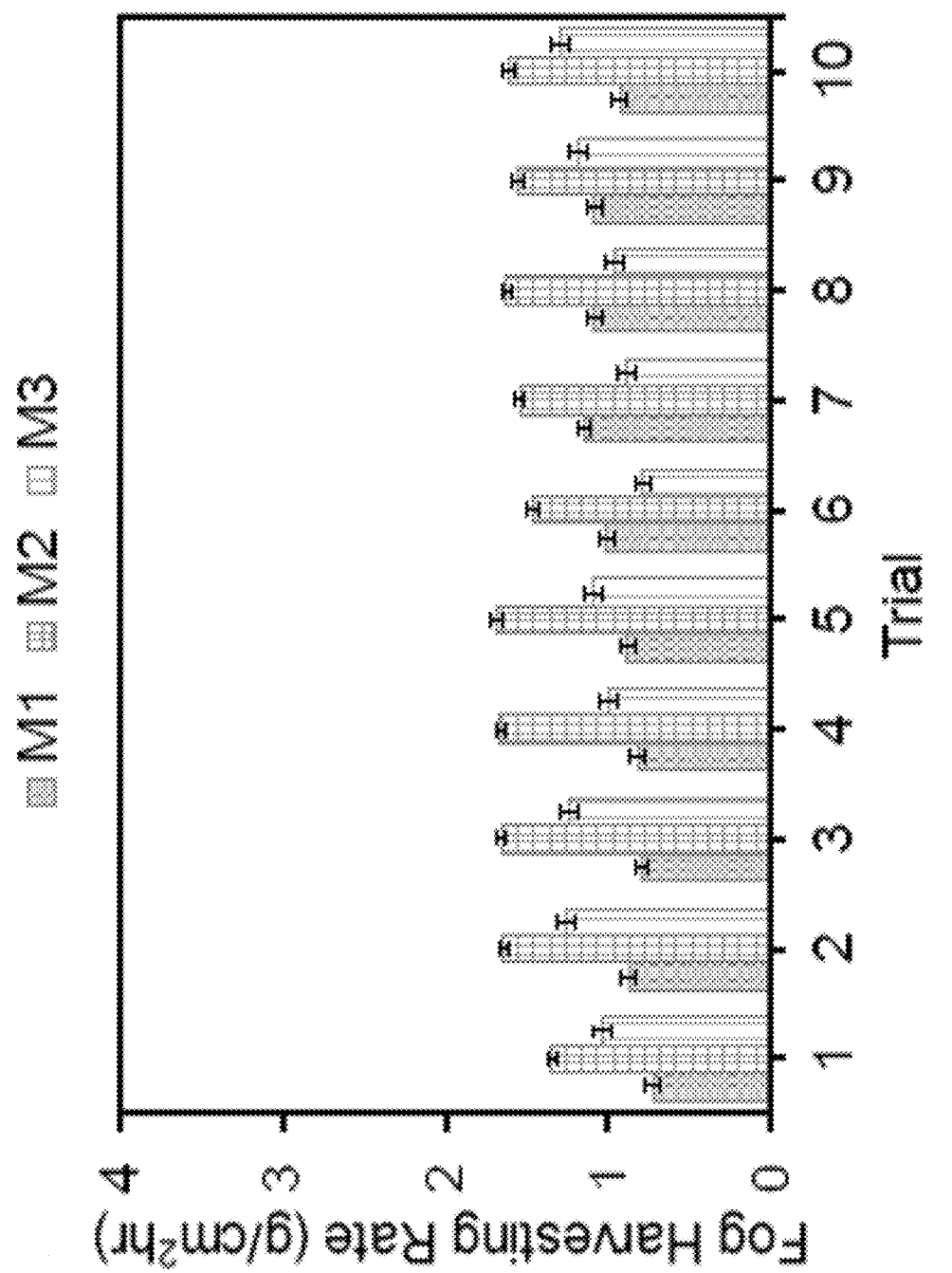

The fog stream was not turned on until the chamber reached a uniform 100 percent humidity, in order to prevent the formation of any condensation that would interfere with the fog harvesting measurements. Note that the humidifier used to maintain 100 percent humidity throughout the chamber was separate from the second humidifier used to produce the local fog stream. The humidity chamber contained small holes to prevent any pressure buildup. A reservoir was placed directly under a sample to collect the drained fog water. Every 30 minutes, the reservoir was removed from the chamber and placed on a mass balance to measure the amount of harvested fog. This was repeated for about 5 hours to ensure that consistent and steady-state fog harvesting rates were obtained (FIGS. 9A-9B). To obtain movies of captured droplets growing and sliding down the fog harvesters, a digital camera (Nikon D5300) was placed on the same side of the sample as the incoming fog stream, but at a slight angle to avoid getting in its path.

Results.

Figure 1:
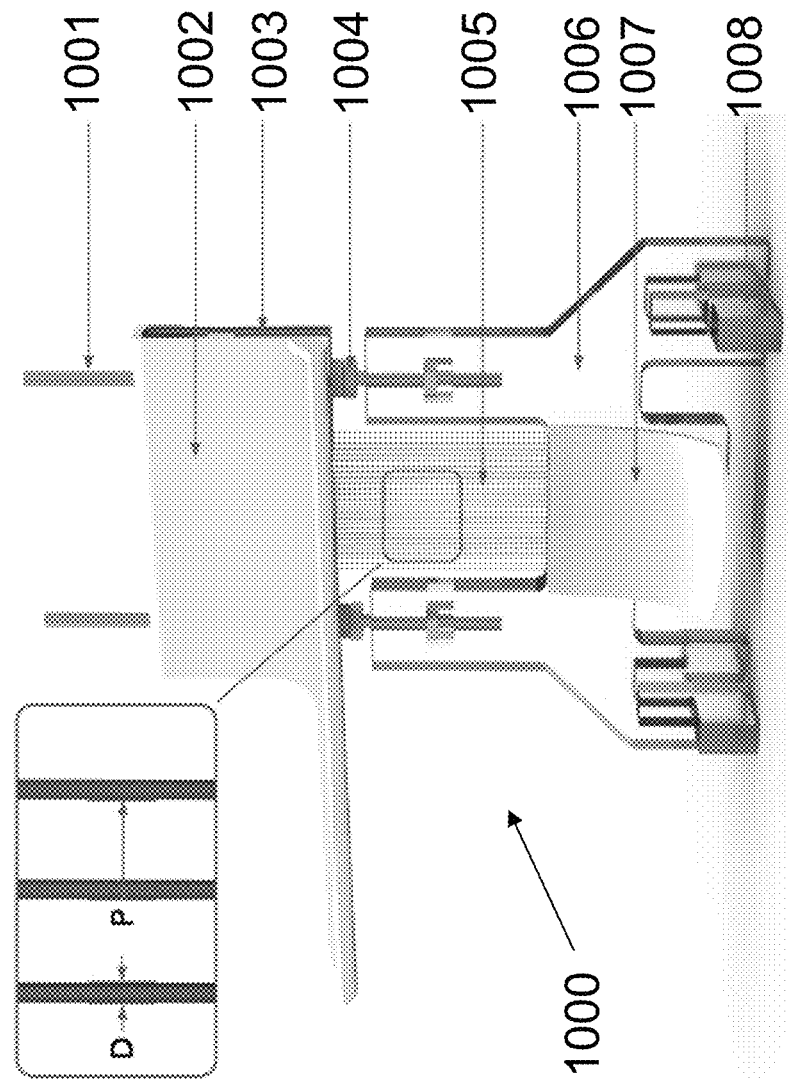
FIG. 1 shows a schematic of a "fog harp" design, where vertically oriented wires of diameter D (diameter of wire) and pitch P (pitch between wires) are held under tension within a frame.
Figure 10A:
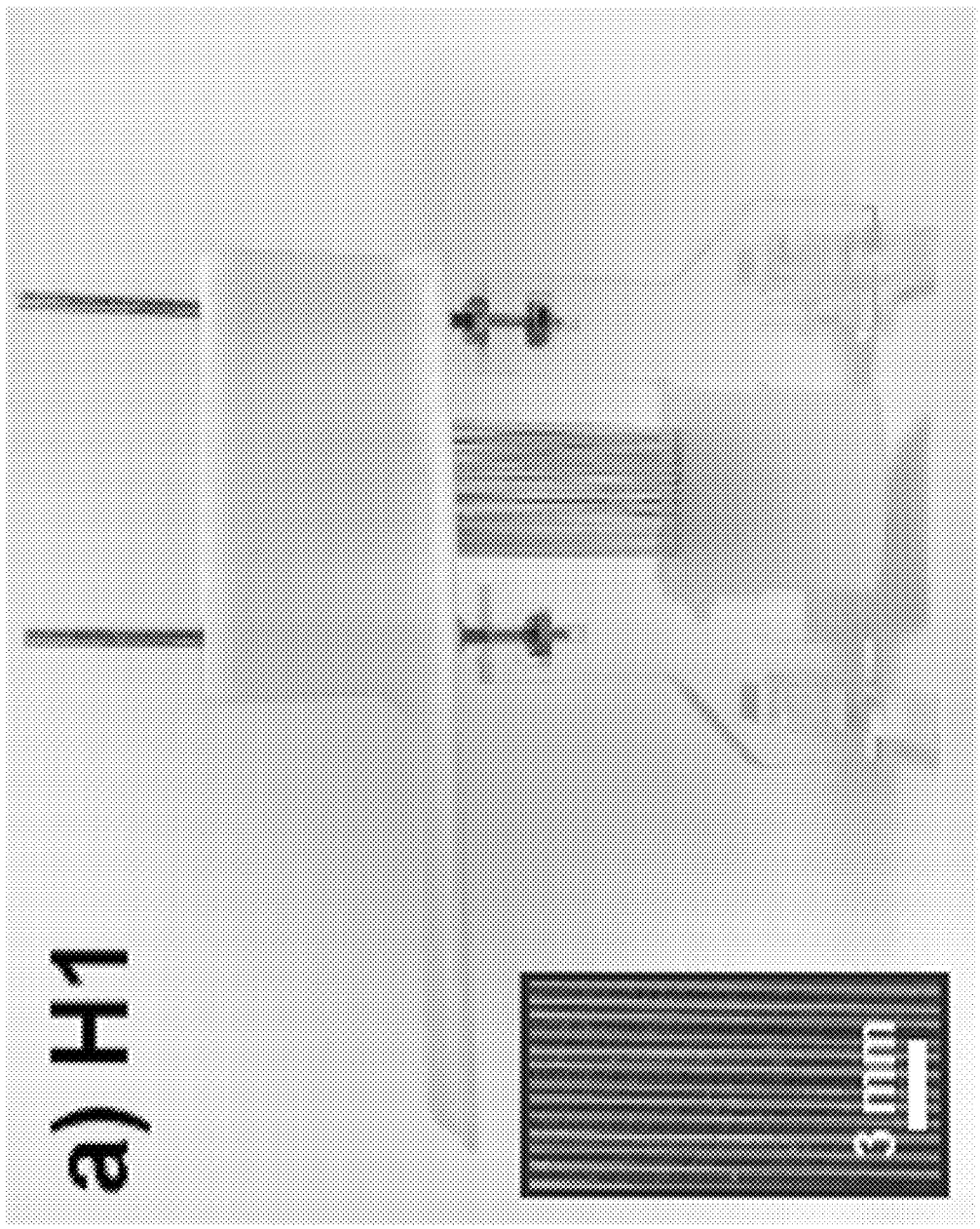
FIGS. 10A-10C show photographic images of the (FIG. 10A) fine-scale (H1), (FIG. 10B) mid-size (H2), and (FIG. 10O) coarse (H3) wires used to construct the fog harps. Insets depict a magnified view of the vertical wire array.
Figure 10B:
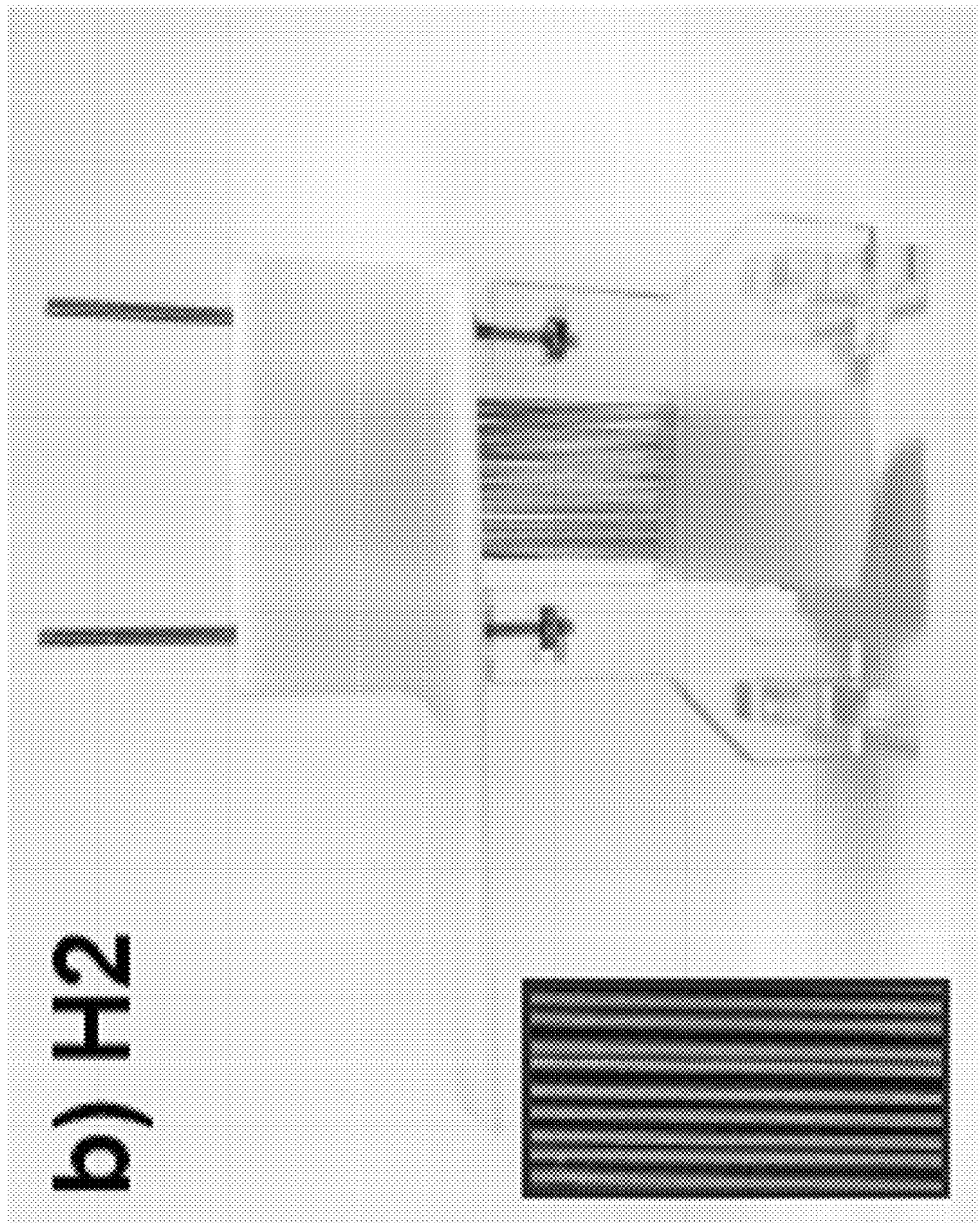
Figure 10C:
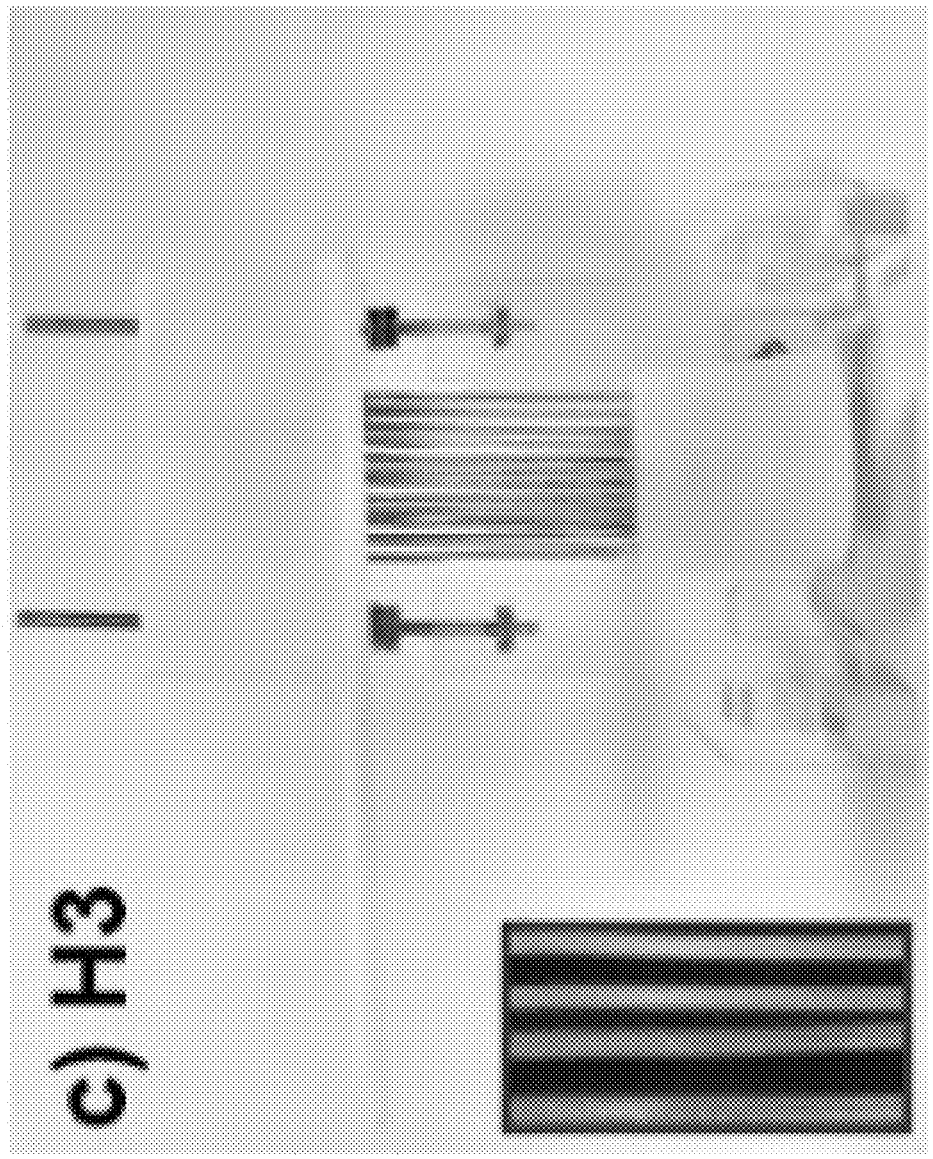

FIG. 1 illustrates the concept of the fog harp design 1000, stainless steel harp wires 1005 are vertically oriented under tension between upper 1003 and lower 1006 laser cut acrylic frames that are held together via stainless steel threaded rod(s) 1001 that can be adjusted via stainless steel adjustment nuts 1004. An upper 3D printed drain 1002 is positioned above the upper laser cut acrylic frame 1003. In other words, the upper laser cut acrylic frame 1003 is underneath the 3D printed upper drain 1002. A lower 3D printed drain 1007 is coupled to/included in the lower laser cut acrylic frame 1006. the lower laser cut acrylic frame 1006 can be coupled to/include one or more laser cut feet 1008. See also e.g., the Methods Section and FIGS. 10A-10C for additional description. As shown in FIG. 1 In contrast to a conventional mesh netting, which is composed of both vertically and horizontally oriented wires, the fog harp described herein is composed solely of vertical wires that are held under tension within a supporting frame. Some older field studies have also used a harp geometry to collect fog samples (29-31). However, these field studies did not vary the size of the wires, characterize the dynamics of droplet shedding, or directly compare harvesting rates to equivalent mesh collectors. The focus of this Example is to systematically vary the geometry of both harps and meshes under controlled laboratory conditions to gain a mechanistic understanding of how harps enhance the fog harvesting dynamics. As discussed herein, several different miniature harp prototypes exhibiting different characteristics but the same pitch-to-diameter ratio, analogous to a recent studying conventional meshes (6).

Specifically, three different wire diameters were used: D=254 μm spring steel wire (harp 1), D=508 μm aluminum wire (harp 2), and D=1.30 mm aluminum (harp 3). The pitch (i.e. center-to-center separation) between adjacent wires on the same row was designed to be exactly P=2D for each harp, although for harp 3 the pitch did vary slightly across the sample due to difficulty in threading the larger wire. This resulted in a shade coefficient of SC=0.5 for all three harps. To serve as a control, three different steel meshes were purchased with near-equivalent dimensions: D=229 μm, P=2.2.D, and SC=0.7 (mesh 1), D-711 μm, P=2.2D, and SC=0.69 (mesh 2), and D=1.60 mm, P=2.0D, and SC –0.75 (mesh 3). For simplicity, the three harps are referred to as H1, H2, and H3, while the three meshes are M1, M2, and M3 (FIG. 14). No surface functionalization was performed, in order to emphasize the practicality of our fog harvesters. Note that the use of both steel and aluminum materials was purely due to limitations in what was commercially available for the various geometries, however the surface wettability did not vary significantly (FIG. 15).

Figure 2A:
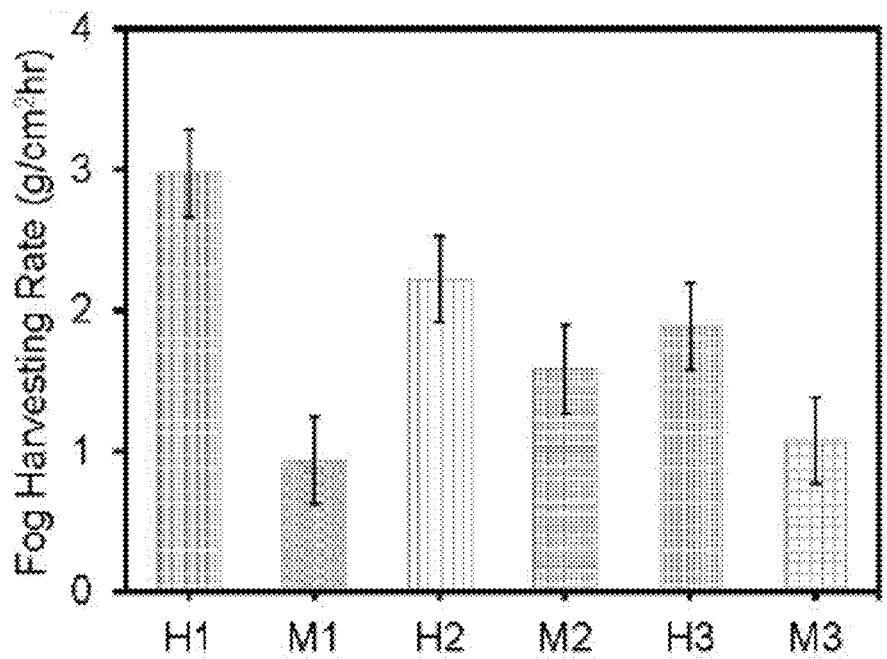
FIGS. 2A-2B show graphs that can demonstrate (FIG. 2A) fog harvesting rates for each of the three harps and meshes tested and (FIG. 2B) the shedding rate as measured in droplets per minute. The performance of the harps was observed to improve continuously with decreasing size, culminating in a three-fold enhancement in harvesting for the fine-scale harp (H1) as compared to an equivalent mesh (M1). The number of droplets observed to slide down a harvester was observed to be at least an order of magnitude larger for harps as compared to meshes. This can explain why fine-scale harps avoid the clogging problem endemic to fine meshes.

FIG. 2A shows the fog harvesting rates for each harp and equivalent mesh. For the classical mesh design, the mid-sized mesh (M2) harvested 1.7 times more water compared to the fine mesh (M1) and 1.5 times more than the coarse mesh (M3). This is due to the aforementioned dual constraints of clogging for fine meshes and inefficient fog capture for coarse meshes (6). In contrast, the harvesting rate for the fog harps described herein increased monotonically with decreasing feature size due to its unique ability to prevent clogging. Specifically, the fine harp (H1) harvested about 15 percent more water than the mid-sized harp (H2), which in turn harvested about 10 percent more than the coarse harp (H3).

Figure 2B:
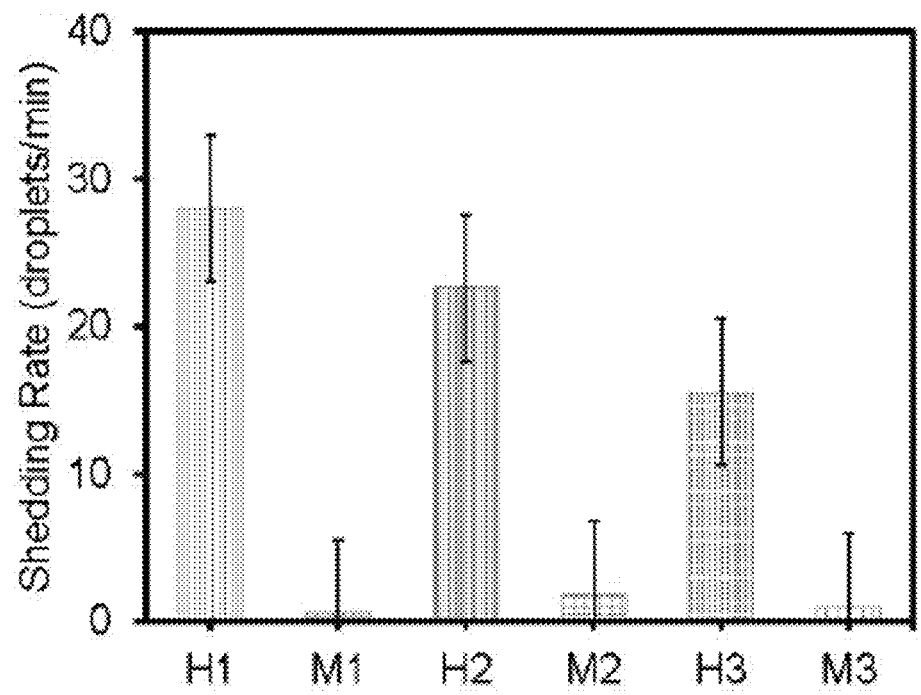

The fog harp's ability to avoid clogging even at small scales is due to the reduced pinning force of droplets shedding parallel to the axis of the wires, compared to a mesh where orthogonal wires impede the contact line. This is somewhat analogous to the well-known case of droplets sliding parallel to superhydophobic grooves (32-33), as both cases exhibit only liquid-air interfaces between the axial features and avoid any obstacles orthogonal to the receding contact line. To illustrate the contrast in droplet mobility between harps and meshes, FIG. 2B quantifies the number of droplets per minute that were able to slide down a surface to fall into the collector. For all three sizes of wiring, the harp was able to shed more droplets by at least an order of magnitude. For the fine-scale wiring, the rate of droplet shedding was two orders of magnitude higher for H1 compared to M1, which can explain how the small-scale harp can avoid clogging.

By avoiding the clogging limit, harp H1 harvested over 3 times more water compared to mesh M1 (FIG. 2A). Even when comparing the mid-sized wires, where the mesh performance was optimal, H2 harvested 1.4 times more water than M2. In short: the fog harps described herein always collect more water than an equivalent mesh, with the comparative benefit increasing dramatically with decreasing wire diameter. Only fine-scale fog harps can capture and shed droplets efficiently (FIG. 3C), in contrast to coarse harps/meshes which cannot capture fog efficiently (FIGS. 3B and 3D) or fine meshes, which cannot effectively drain the collected water and become clogged (FIG. 3A).

The water-harvesting rate is directly correlated with a structure's overall fog collection efficiency: $\eta=\eta_a\eta_d$, where $\eta_a$ is the aerodynamic efficiency of the wind stream and rid is the deposition efficiency of fog droplets suspended in the wind passing through the wires. 6 A previous work modeled $\eta_a$ by relating the drag of the wire structure to the resulting decrease in velocity of the wind passing through. (17) By conservation of mass, the cross-sectional area of the wind upstream that will pass through the structure continually decreases with increasing drag, which would diminish the amount of fog heading toward the harvester. This can be expressed analytically as where $C_0$ is the pressure drop coefficient of the harp/mesh and $C_d$ is the drag coefficient for an equivalently shaped plate that is impermeable. For fog harvesters where the total width and height are comparable to each other, $C_d \approx 1.18$. For metal wires, where $k_{Re}$ is an empirical correction factor (see FIG. 12) required when $Re=\rho_{air}v_0D/\mu_{air}<400$, where $\rho_{air}$ and $\mu_{air}$ are the density and viscosity of air, respectively (17,34). The local maximum in aerodynamic efficiency occurs for $SC \approx 0.55$, (6) In view of this, a P/D=2 for the fog harps was used here (i.e., SC=0.5).

The deposition efficiency can be calculated using Eq. 4 and depends upon the Stokes number, which compares the response time of suspended fog droplets to that of their streamlines getting perturbed by the wires. In other words, larger values of St result in more droplets impacting the wires of a harvester, whereas smaller values result in more droplets flowing around the wires.

Figure 11A:
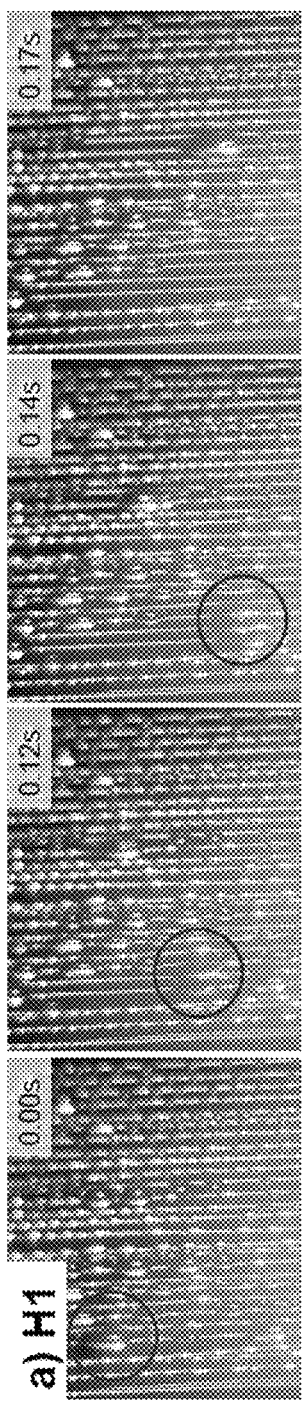
FIGS. 11A-11C each show a series of images depicting the shedding of water droplets on each fog harp (H1—FIG. 11A, H2—FIG. 11B, H3—FIG. 11C).
Figure 11B:
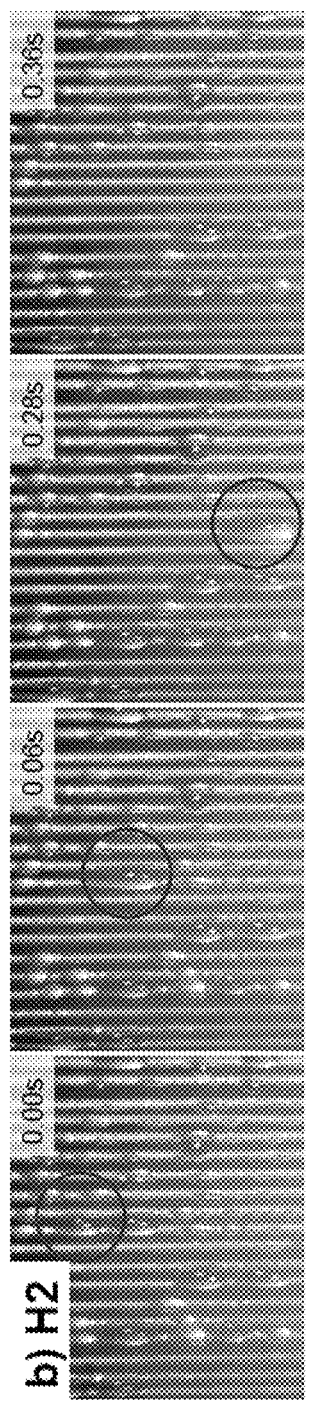
Figure 11C:
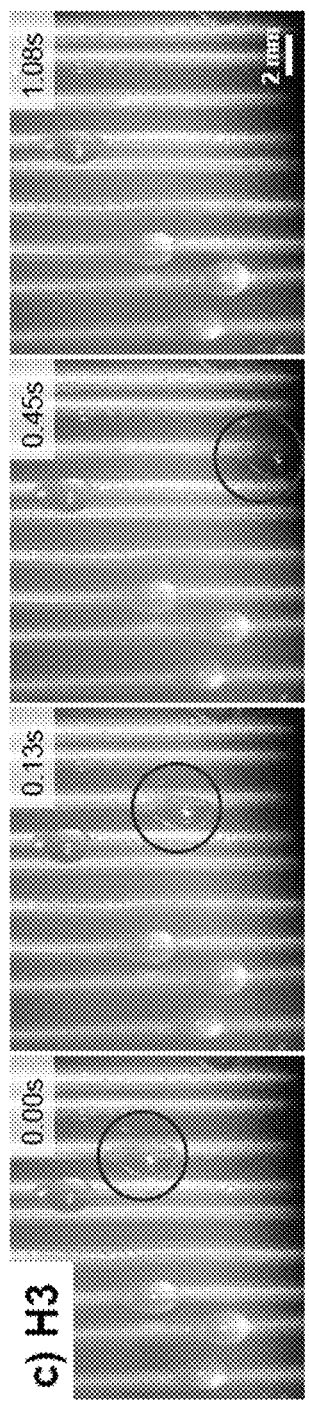

In terms of collection efficiency, H1 collected about 15 percent of the total water mass ejected by the humidifier tube, compared to only about 5 percent for M1 (FIGS. 11A-11C). These relatively low values can be rationalized by considering the low Stokes number of the system St about 0.1 (FIG. 14) compared to St about 100 for typical outdoor fog harvesting environments (6). Algebraically, $St=(2\rho v r^2_{fog})/(9\mu_{air}R_{wire})$ (Equation 7) about 1, where p is the density of water, v=0.15 m/s is the unimpeded velocity of the fog stream, $r_{fog}=7$ μm is the radius of the fog droplets, $\mu_{air}$ is the air viscosity, and $R_{wire}$ is the wire radius. The Stokes number compares the response time of the suspended fog droplets to that of the surrounding streamlines, were larger values of St result in more droplets impacting a harvester.

The effective drainage of droplets down fog harps can be quantified using a contact angle hysteresis model. As demonstrated by Furmidge and many follow-up reports, the pinning force is cause by contact angle hysteresis and acts along the receding contact line (34, 35). A droplet on a single wire can either engulf the wire in a barrel state or rest on one side (36), for harp H3, the latter behavior was observed (FIG. 3D). The receding contact line would therefore have a length of approximately πR. Hence, the theoretical critical volume ($V_{c,t}$) required for droplet to slide down the wire can be estimated by Equation (1):

$$\rho_{water} g V_{c,t} \approx \pi R_{wire} \gamma (\cos \Theta_r - \cos \Theta_a), \quad \text{(Eq. 1)}$$

where ρ and γ are the droplet's density and surface tension, g is gravity, R is the wire radius, and $\Theta_r$ and $\Theta_\alpha$ are the droplet's receding and advancing contact angles on steel (H1, M1, M2, and M3) or aluminum (H2 and H3) wires. The receding and advancing contact angles were measured from video footage of fog droplets sliding down fog harps, with five trials averaged together for both aluminum and steel wires (FIG. 15). Plugging in all of these values produced a theoretical critical sliding volume of $V_{c,t} \approx 3.3 \pm 1.0$ μL.

To make generalized remarks about the theoretical collection efficiency of fog harps, we assign typical real-world conditions of $r_{fog}$=5 μm and v0=6 m/s to the above model. (35) The calculated values of $\eta_a$, $\eta_d$, and $\eta = \eta_a \eta_d$ are then plotted against the main design parameter of interest: $R_{wire}$ for a fixed SC=0.5 (FIG. 4D). It can be seen that $\eta_a$ only decreases by about 2% as the wire size decreases from $R_{wire}$~1 mm to $R_{wire}$~100 μm, whereas $\eta_d$ increases by nearly 40%. Continuing to decrease, $R_{wire}$ beneath 100 μm results in slight decreases in $\eta_a$ that mostly cancel out increases in $\eta_d$. Thus, as the wire size decreases from $R_{wire}$~1 mm to $R_{wire}$~100 μm, the overall capture efficiency increases from n≈12% to plateau at a performance ceiling of η≈20%.

This increase in η by a factor of 1.7 with decreasing wire size is in good agreement with experimental results demonstrated elsewhere herein, where harp efficiency for H1 was about η≈15% (FIG. 13), somewhat less than the n≈20% predicted by the model.

FIGS. 4A-4C show illustrations of the three different geometrical scenarios considered for droplet shedding. FIG. 4A considers a droplet sliding down one side of a single vertical wire. FIG. 4B considers a column of water sliding between two adjacent wires. FIG. 4C considers a droplet shedding down a classical mesh structure clogged with water. The experimental critical volume ($V_{c,e}$) for sliding is not explicitly known, but can be estimated from its observed geometry. The volume of a droplet sliding down one side of a single vertical wire can be approximated as the sum of a half-cone of height h and base a and a quarter spheroid of equatorial radius a and polar radius c (FIG. 4A). Provided that α<(P-R), it follows that a droplet will slide down the harp on a single wire without touching any other wires. This was indeed the case for H3, where P-R=1.94 mm was greater than α≈0.9 mm. Measurements of h, α, and c for five different videos of a droplet beginning to slide down a wire yielded an average $V_{c,e} \approx 2.7 \pm 0.3$ μL, in good agreement with $V_{c,t} \approx 3.3 \pm 1.0$ μL from equation 1 given the geometrical simplifications.

For fog harps H1 and H2 α>(P-R), such that the droplet will touch a second wire prior to sliding, which transforms the water into a column shape (FIG. 4B) (37). For a water column growing between a pair of wires, the critical departure size was then found by Equation (2):

$$\rho_{water} g V_{c,t} \approx 2\pi R_{wire} \gamma (\cos \Theta_r - \cos \Theta_\alpha), \quad \text{(Eq. 2)}$$

where the extra factor of 2 on the right-had side accounts for the dual receding contact lines that run along the inner half of each wire circumference. Equation 2 results in $V_{c,t} \approx 2.6 \pm 0.8$ μL and $1.3 \pm 0.7$ μL for H2 and H1, respectively. While the experimental values of $V_{c,e}$ were not explicitly known, they can be and were estimated by measuring the height (h) and width (w) of five trials of sliding water columns and assuming a cuboid shape: V≈hwD. The averaged experimental values of $V_{c,e} \approx 1.8 \pm 0.4$ μL for H2 and $V_{c,e} \approx 0.81 \pm 0.17$ μL for H1, respectively, were a good match with their theoretical counterparts (FIG. 15).

Importantly, both the model and the experiments predict that the critical droplet volume is proportional to the wire size for fog harps. This can explain why the fog harps can actually shed water more efficiently at finer scales to avoid clogging. This can be further quantified by considering the critical Bond number of the shedding droplets, $Bo_c = V_{c,e}^{1/3}/L_C$, where $L_C = \sqrt{\gamma/(\mu g)} = 2.7$ mm is the capillary length scale of water (38). The Bond number compares the forces of gravity and surface tension, and decreased from $Bo_c$=0.51 to 0.34 when comparing H3 to H1, while remaining relatively unchanged at $Bo_c \approx 0.5$ for the three meshes (FIG. 15). In other words, decreasing the wire size of fog harps can enable droplets to shed at length scales far beneath that of the capillary length, which is not possible for traditional structures such as meshes.

Figure 5A:
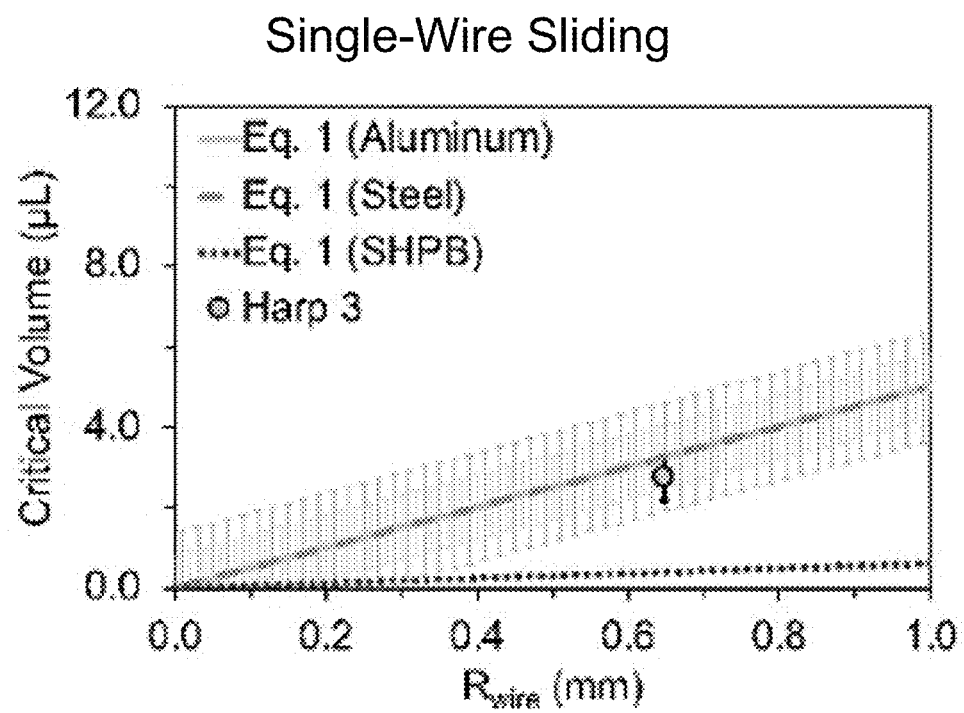
FIGS. 5A-5B show graphs that can demonstrate the results from scaling models that can predict the critical departure volume for droplets sliding down (FIG. 5A) single wire (Eq. 1) and (FIG. 5B) between two wires (Eq. 2). Each data set represents a different surface wettability, including aluminum ($\Theta_r/\Theta_a=31°/50°$), steel ($\Theta_r/\Theta_a=33°/51°$), and superhydrophobic (SHPB, $\Theta_r/\Theta_a=160°/165°$). Data points represent experimental measurements from the three scale model harps.
Figure 5B:
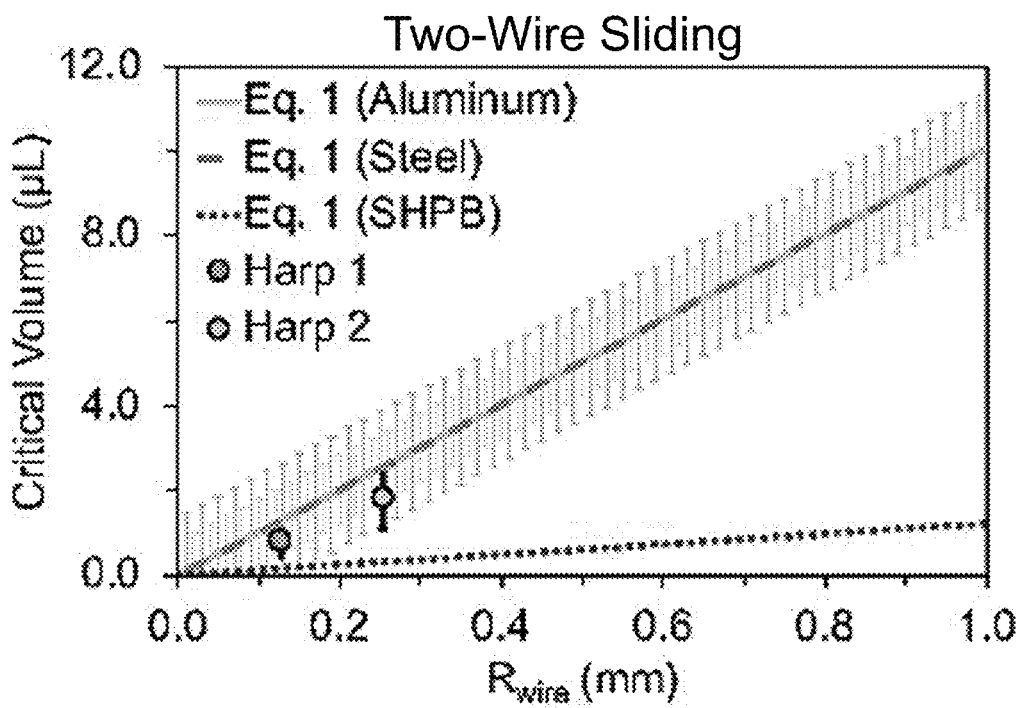
Figures 6A, 6B:
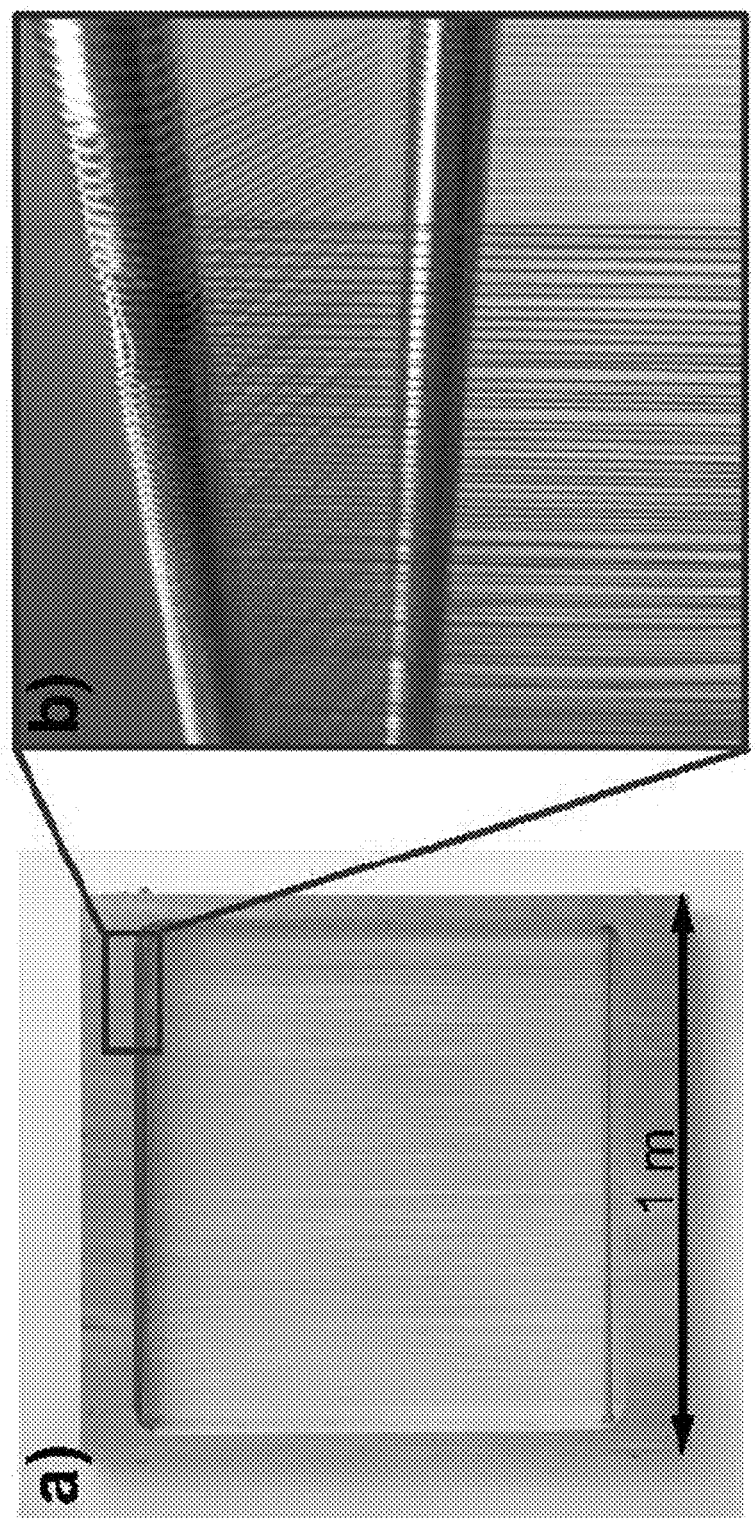
Figure 6F:
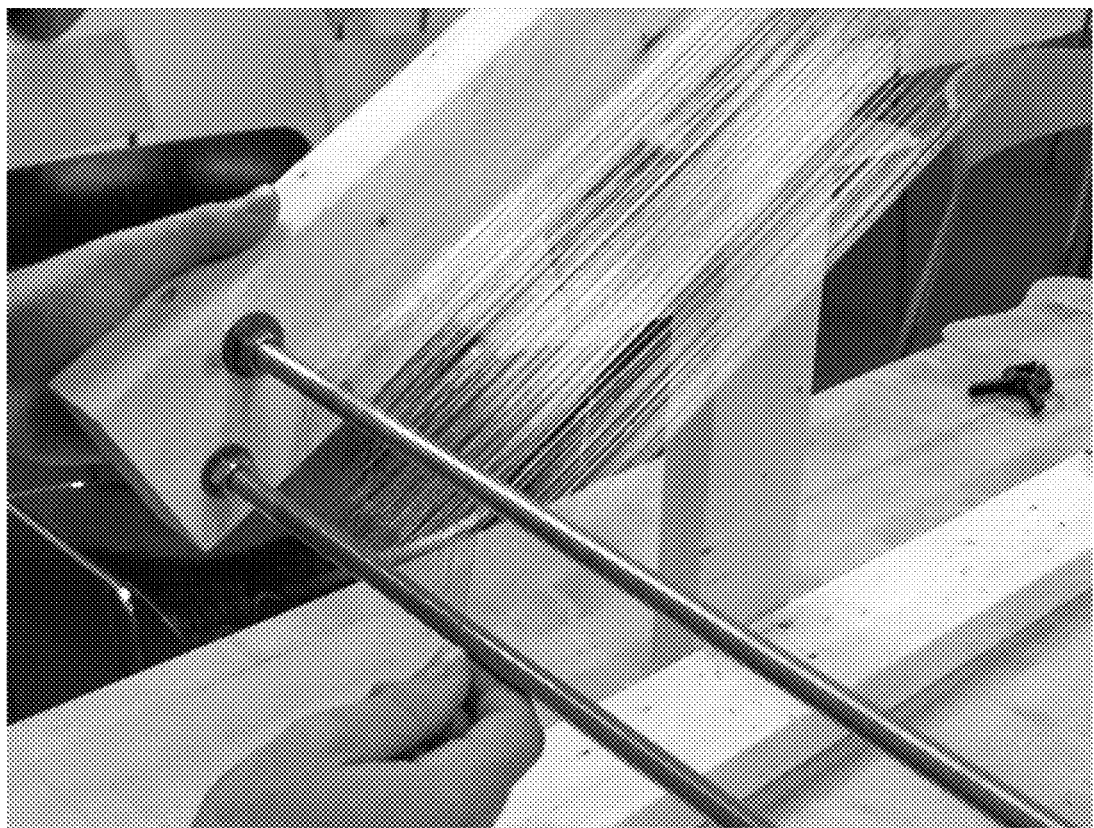

This physical model for droplets sliding down fog harps is summarized in FIGS. 5A-5B. The Theoretical critical droplet size for sliding down the side of a single wire is predicted as a function of the wire radius (Eq. 1) for given values of $\Theta_r$ and $\Theta_\alpha$ in FIG. 5A. The different data series represent the various surface materials, with the aluminum (orange line) and steel (green) virtually overlapping due to their similar wettability. The only experimental case of single-wire sliding, aluminum harp H3, is also added to this graph with excellent agreement to the theory line. The same analysis is repeated in FIG. 5B for the case of two wire sliding, where data points representing $V_{c,e}$, for steel harp H1 and aluminum harp H2 fall along the theoretical lines (Eq. 2). This model can also be used to confirm that the enhancement in performance of H2 versus M2 is not due to their moderate (≈28%) difference in wire diameter (cf. FIG. 14); even when hypothetically using an equivalent D=0.71 mm for H2, its $V_{c,t}$ is twice as small as $V_{c,e}$ for M2. For both plots, a third theoretical line (red) represents the hypothetical case of superhydrophobic wires, of surface wettability $\Theta_r$=160° and $\Theta_\alpha$=165°. For any given value of R, the superhydrophobic wires reduced $V_{c,t}$ by a factor of eight compared to the uncoated wires, illustrating that reducing the contact angle hysteresis is an additional strategy (in addition to reducing wire size) for maximizing droplet shedding. This Example focused on the practical case of uncoated, hydrophilic wires.

Modeling the hysteresis of droplets sliding down the mesh structures is significantly more complex, due to the presence of the intersection horizontal wires (39) and the tendency of the water to partially or fully clog the holes. When observing fog collecting on surfaces M2 or M3, it was seen that droplets only partially clog individual holes in the mesh prior to shedding. Further, the shedding events themselves followed a tortuous path along the mesh and often involved chain reactions between water in adjacent holes. Therefore, any analytical model for M2 or M3 is beyond the scope of this Example, and thus direction is turned to the experimental values of $V_{c,e}$ in Table 2.

For the fine-scale mesh M1, the holes were uniformly clogged and the shedding dynamics of a droplet were more simple. It was observed that each shedding droplet was much larger than any individual hole size, such that the droplet's receding contact line extended horizontally along a single wire (FIG. 4C). It follows that the critical droplet volume scales according to Equation (5):

$$\rho_{water} g V_{c,t} \approx w \gamma (\cos \Theta_r - \cos \Theta_\alpha), \quad \text{(Eq. 5)}$$

where w is the width of the receding contact line along a horizontal wire and had to be measured to predict $V_{c,t} \approx 6 \pm 03$ μL. By measuring both the width (w) and height (h) of five droplets sliding down the clogged mesh, the experimental critical volume was found by assuming a cuboid shape: $V_{c,e} \approx hwD \approx 4.1 \pm 0.8$ μL. Looking at FIG. 14, it is apparent that sliding droplets on the mesh structure do not seem to get any smaller with decreasing wire size (unlike harps), which causes the clogging issue. Finally, it is noted that sliding droplets on harp H1 were smaller than with mesh M1 by a factor of 5.

This the scalability of the fog harps described herein was demonstrated by creating a large, 1 m² model fog harp. The full-scale prototype was made with common wood 2×4s, threaded rods, and the same steel wire used for harp H1 having a diameter of about 254 μm. The harp frame was about 101.6 cm long with four 91 cm long threaded rods spanning between the wooden frame (FIGS. 6A-6F). One set of holes drilled into the wood were routed into slots, so one rod could be moved to tighten the wires if they become loose. This square frame structure enabled the wires to be wrapped around the threaded rods to create the parallel wire geometry analogous to the smaller fog harps tested in the lab. Threaded rods were used because thy provided grooves into which the wires would remain in place at a consistent pitch. Specifically, we used 7/16"=20" threaded rods because they approximated scale-model harp H1, which produced the best fog collection results.

After initial tests manually wiring the fog harp by wrapping the stainless steel wire around the rods in loops, a more automated system was devised to expedite the wiring process. It was calculated that a 1 m2 fog harp needs over 700 loops. To accelerate wiring the prototype, the fog harp was mounted to a stand with an axel and the harp was rotated while aligning the wire to the threaded groves of the rods. Mass production can be enabled by robotic weaving technology (40) or traditional textile mill technology. At the edges of a fog harp constructed with an industrial loom, the wires could be anchored in bands of resin such that the wires could be pulled and tightened on the top and bottom similar to what is already done for mesh netting.

In sum, this Example can demonstrate that fog harps composed of vertical wire arrays can harvest at least 3 times more fog compared to equivalent mesh netting. The mechanism is the reduced pinning force of droplets sliding unimpeded down the parallel wires of the fog harp, which can enable the efficient drainage of small water droplets even for micrometric wire sizes. The fog harp design demonstrated herein can allow for ultra-fine-scale wires that capture micrometric fog droplets efficiently while also avoiding clogging, which is in contrast to fine mesh structures that easily clog and become effectively impermeable to the air currents.

References for Example 1

(1) Mekonnen and Hoekstra. Sci. Adv. 2016, 2, e1500323.
(2) (Schemenauer and Cereceda. AMS 1994, 33, 1313-1322.
(3) Fessehaye et al. Renew. Sustainable Energy Rev. 2014, 29, 52-62.
(4) Oliver and de Rautenbach. Atmos. Res. 2002, 54, 228-238.
(5) Klem et al. AMBIO 2012, 41, 221-234.
(6) Park et al. Langmuir 2013, 29, 13269-13277.
(7) Lalia et al. Langmuir 2014, 29, 13081-13088.
(8) Rajaram et al. Colloids Surf. A 2016, 508, 218-229.
(9) Holems et al. Atmos. Res. 2015, 151, 236-249.
(10) Rivera and L-Garcia. Atmos. Res. 2014, 151, 250-258.
(11) Azad et al. Bioinspir. Biomim. 2015, 10-016004.
(12) Cao et al. Small 2015, 11, 4379-4384.
(13) Ghosh et al. Energy 2015, 89, 1018-1028.
(14) Azad et al. Langmuir 2017, 33, 5555-5564.
(15) Regalado and Ritter. Atmos. Res. 2016, 178-179, 45-54.
(16) Schemenauer and Joe. Atmos Res. 2011, 102, 335-342.
(17) de Dios Rivera. Atmos. Res. 1989, 24, 53-69.
(18) Seo et al. Sci. Rep. 2016, 6, 24276.
(19) Lee et al. Langmuir 2012, 28, 10183-10191.
(20) Seo et al. Langmuir 2014, 30, 15468-15476.
(21) Wang et al. ACS Appl. MAtr. Interfaces 2016, 8, 2950-2960.
(22) Yang et al. Sci. Rep. 2017, 7, 8816.
(23) Wu et al. Interfaces 2017, 4, 1600801.
(24) Gursoy et al. *Salsola crassa*. Colloids Surf. A 2017, 529, 195-202.
(25) Venkateshan and Tafreshi. Colloids Surf. A 2018, 598-310-319.
(26) Torresin et al. Langmuir 2013, 29, 840-848.
(27) Paxson et al. Adv. Mater. 2014, 26, 418-423.
(28) Smith et al. Soft Matter 2013, 9, 1772-1780.
(29) Fukutomi and Tabata. Low Temperature Sci. 1948, 4, 43.
(30) Goodman. 1985, 21, 392-394.
(31) Demoz et al. Atmos Res. 1996, 41, 47-62.
(32) Chen et al. Colloid Interface Sci. 2005, 281, 458-464.
(33) Kusumaatmaja et al. Langmuir 2008, 24, 7299-7308.
(34) Furmidge. J. Colloid Sci. 1962, 17, 309-324.
(35) de Gennes et al. Capillarity and wetting phenomena: drops, bubbles, pearls, waves; Springer Science & Business Media, 2013.
(36) Eral et al. Soft Matter 2011, 7, 5138-5143.
(37) Protiere et al. Soft Matter 2013, 9, 271-276.
(38) Semprebon and Brinkmann. Soft matter 2014, 10, 3325-3334.
(39) Amrei et al. Langmuir 2016, 32, 13333-13339.
(40) Parascho et al. Modular Fibrous Morphologies: Computational Design, Simulation and Fabrication of Differentiated Fiber Composite Building Components; Springer International Publishing, 2015.
(41) Ju et al. Nat. Commun. 212, 3, 1-6.
(42) Ju et al. Adv. Mat. 2013, 25, 5937-5942.
(43) Cao et al. Adv. Funct. Mater. 2014, 24, 3235-3240.
(44) Malik et al. Bioinspir. Biomim. 2015, 10, 1-15.
(45) Pan et al. Nature Plants 2016, 2, 16076.
(46) Xu et al. ACS Nano. 2016, 10, 10681-10688.
(47) Xing et al. RSC Adv. 2017, 7, 29606-29610.
(48) Andrews et al. Langmuir 2011, 27, 3798-3802.
(49) Sharma et al. Flora 2016, 224, 59-65.
(50) Bai et al. Adv. Mater. 2011, 23, 3708-3711.
(51) Dong et al. Adv. Mater. Interfaces. 2016, 3, 1500831.
(52) Duprat et al. Nature 2012, 482, 510-513.

We claim:

1. A method of collecting fluid from fog or other air source, the method comprising:
   passing the fog or other air source through a fog harvester, wherein the fog harvester comprises a frame and a vertical wire array comprising wires, wherein the vertical wire array is coupled to the frame, and wherein no wire in the vertical wire array contacts any other wire in the vertical wire array;
   allowing fluid droplets to form on or between wires of the vertical wire array; and
   collecting fluid droplets that slide off the wires of the vertical wire array.

2. A fog harvester comprising:
a frame; and
a vertical wire array comprising wires, wherein the vertical wire array is coupled to the frame, and wherein no wire in the vertical wire array contacts any other wire in the vertical wire array.

3. The fog harvester of claim 2, wherein the wires are coupled between two threaded rods each having two ends, wherein each wire is parallel to one or more other wires between the two threaded rods and does not cross over any other wire, and
wherein the ends of each of the rods are coupled to the frame such that the wires are oriented vertically within the frame.

4. The fog harvester of claim 3, wherein the frame has a top portion, a bottom portion, and at least two side portions and wherein the ends of the threaded rods are coupled to the side portions of the frame, wherein one of the threaded rods is coupled to the side portions of the frame near the top portion of the frame, and wherein the other threaded rod is coupled to the side portions of the frame near the bottom portion of the frame.

5. The fog harvester of claim 4, wherein the frame comprises a collection reservoir in a region of the frame underneath at least a part of the vertical wire array and configured to collect droplets of liquid that collect and slide off of the wires of the vertical wire array.

6. The fog harvester of claim 5, wherein the collection reservoir is in the bottom portion of the frame, a side portion of the frame, or the bottom portion and a side portion of the frame.

7. The fog harvester of claim 5, wherein the collection reservoir is coupled to a hose.

8. The fog harvester of claim 2, wherein each wire of the vertical wire array is attached at each end to opposing sides of the frame, wherein each wire is parallel to one or more other wires and does not cross over any other wire.

9. The fog harvester of claim 8, wherein the frame comprises a collection reservoir in a region of the frame underneath at least a part of the vertical wire array and configured to collect droplets of liquid that collect and slide off of wires in the vertical wire array.

10. The fog harvester of claim 9, further comprising a hose, wherein the hose is coupled to the collection reservoir.

11. The fog harvester of claim 2, wherein the shape of frame forms a regular shape.

12. The fog harvester of claim 2, wherein the distance between each wire in the vertical wire array is substantially the same.

13. The fog harvester of claim 2, wherein the distance between two wires in the vertical wire array is different than the distance between two different wires in the vertical wire array.

14. The fog harvester of claim 2, wherein the distance between two wires in the vertical wire array ranges from about 2 micrometers to about 10 mm.

15. The fog harvester of claim 2, where the cross sectional diameter of the each of the wires in the vertical array ranges from about 1 micrometer to about 5 mm.

16. The fog harvester of claim 2, wherein the wires have a surface and wherein the surface is hydrophobic or superhydrophobic.

17. The fog harvester of claim 2, wherein the wires are steel or a steel alloy.

18. The fog harvester of claim 2, wherein the wires are coated with a hydrophobic or superhydrophobic composition.

19. A system comprising:
at least two fog harvesters, wherein the at least two fog harvesters are coupled to each other, and wherein at least one or more or at least two or more of the two or more fog harvesters each comprise
a frame; and
a vertical wire array comprising wires, wherein the vertical wire array is coupled to the frame, and wherein no wire in the vertical wire array contacts any other wire in the vertical wire array.

* * * * *